US006850631B1

(12) United States Patent
Oda et al.

(10) Patent No.: US 6,850,631 B1
(45) Date of Patent: Feb. 1, 2005

(54) PHOTOGRAPHING DEVICE, IRIS INPUT DEVICE AND IRIS IMAGE INPUT METHOD

(75) Inventors: Takahiro Oda, Tokyo (JP); Yuji Ohta, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/253,795

(22) Filed: Feb. 22, 1999

(30) Foreign Application Priority Data

Feb. 20, 1998 (JP) ............................................ 10/038661
Nov. 12, 1998 (JP) ............................................ 10/322166

(51) Int. Cl.⁷ ............................ G06K 9/00; H04N 7/18; A61B 3/10
(52) U.S. Cl. ........................... 382/117; 348/78; 351/218
(58) Field of Search .................................. 382/117, 118, 382/116; 351/205, 206, 207, 210, 212, 213, 218, 221, 211, 237; 348/78

(56) References Cited

U.S. PATENT DOCUMENTS

| | | | |
|---|---|---|---|
| 3,966,310 A | * 6/1976 | Larson | 351/221 |
| 4,641,349 A | 2/1987 | Flom et al. | 382/117 |
| 5,016,282 A | * 5/1991 | Tomono et al. | 382/117 |
| 5,291,560 A | 3/1994 | Daugman | 382/117 |
| 5,532,772 A | * 7/1996 | Fujieda et al. | 351/211 |
| 5,572,596 A | 11/1996 | Wildes et al. | 382/117 |
| 5,646,709 A | * 7/1997 | Carter | 351/218 |
| 5,661,538 A | * 8/1997 | Carter | 351/237 |
| 5,991,431 A | * 11/1999 | Borza et al. | 382/117 |
| 6,022,108 A | * 2/2000 | Yoshida et al. | 351/208 |
| 6,148,094 A | * 11/2000 | Kinsella | 345/167 |
| 6,201,540 B1 | * 3/2001 | Gallup et al. | 345/339 |

FOREIGN PATENT DOCUMENTS

| | | | |
|---|---|---|---|
| JP | 63-041084 | 8/1989 | |
| JP | 07-021352 | 7/1996 | |
| JP | 06-266497 | 10/1996 | |
| JP | 07-073227 | 10/1996 | |
| JP | 09160716 | 6/1997 | ........... G06F/3/033 |
| JP | 08-138337 | 12/1997 | |
| JP | 08-178592 | 1/1998 | |
| JP | 08-226986 | 3/1998 | |
| WO | WO-97/46978 | * 11/1997 | ............ G07C/9/00 |
| WO | WO97/46979 | 12/1997 | ............ G07C/9/00 |

* cited by examiner

*Primary Examiner*—Mehrdad Dastouri
(74) *Attorney, Agent, or Firm*—Venable LLP; Michael A. Sartori

(57) ABSTRACT

The object of the present invention is to provide a photographing device, iris image input device and iris image input method capable of rapidly and accurately acquiring an iris pattern code of a person to be identified regardless of the height of the person to be identified. In order to achieve this object, with an iris image input device of the present invention, a portable photographing device is connected to a recognition unit and a monitor. The person to be identified that is to photograph their iris uses this iris input device in the following manner. The person to be identified takes the photographing device in one hand, lines up the photographing device with the eye with the iris to be photographed and photographs the iris. While doing this, because the iris image of the eye of the person to be identified photographed by the photographing device is displayed at a monitor of the iris image input device, the person to be identified can adjust the position of the photographing device while looking at the image with their other eye in such a manner that the focal point of the photographing device lines up with the eye being photographed. The iris image input device can therefore acquire iris pattern code for the person to be identified rapidly and accurately.

24 Claims, 22 Drawing Sheets

| NO | geometric pattern | state of eye | instruction to person to be identified |
|----|---|---|---|
| 1 |  | ideally open | hold this state |
| 2 |  | eyes are narrowed or extent to which eyes are opened is small | open eyes wider please |
| 3 |  | eyes looking upwards | please look straight forward |
| 4 |  | eyes looking down | please look straight forward |

PHOTOGRAPHING DEVICE, IRIS INPUT DEVICE AND IRIS IMAGE INPUT METHOD

BACKGROUND OF THE INVENTION

1. Field of the Invention

The present invention relates to a photographing device, iris image input device and iris image input method for generating code capable of identifying an individual from an image (hereinafter referred to as an "iris image") clearly depicting the pattern of an iris of a person or animal and carrying out identification of an individual.

2. Description of Related Art

Conventionally, iris image input devices have been arranged on a stand so that a photographing position is at a prescribed height. A person who is to be photographed, i.e. a person who is to undergo individual recognition in order to confirm whether or not they are who they say they are (hereinafter referred to as "the person to be identified"), then moves their head so that their eye is within the photographing range of the photographing device. When the person's eye is within the photographing range, a camera within the photographing device acquires an image of the iris of the person to be identified. The captured iris image is then converted to code (hereinafter referred to as "iris code") that can be used in recognizing individuals using an iris pattern processing program. This code is then registered in a storage means or compared with iris code already registered in the storage means in order to confirm the identity the person to be identified.

However, with related iris image input devices, the device is fixed at a prescribed height. It has therefore been necessary for a tall person to be identified to substantially bend their hips in order that their face faces the front of the device during photographing. Moreover, it has been necessary for people to be identified that are short in stature to arch their bodies in order that their face faces the front of the device or for them to mount the stand. In these cases, it has therefore been necessary for the person to be identified to adjust their posture several times, resulting in substantial time being taken until the photographing is complete.

There are also cases where the stature of the person to be identified differs each time a photograph is taken, even if the same person to be identified repeatedly photographs their iris. In these cases, a person cannot be identified as the correct person even if this person who was previously identified correctly.

SUMMARY OF THE INVENTION

It is therefore the object of the present invention to provide a photographing device, iris image input device and iris image input method capable of rapidly and accurately acquiring an iris pattern code of a person to be identified regardless of the height of the person to be identified.

In order to achieve this object, the present invention is configured so that a person to be identified takes the photographing device in their own hand and captures their iris image. The photographing device, iris image input device and iris image input method of the present invention are taken to be the most appropriate form for this mode.

DETAILED DESCRIPTION OF THE PREFERRED EMBODIMENTS

The following is a description with reference to the drawings of embodiments of the present invention, with elements common to each drawing being given the same numerals. The various embodiments described in the following can also be combined with parts of the configuration of other embodiments. The present invention also includes practical examples where parts of configurations are combined.

First Embodiment

Figure 1:
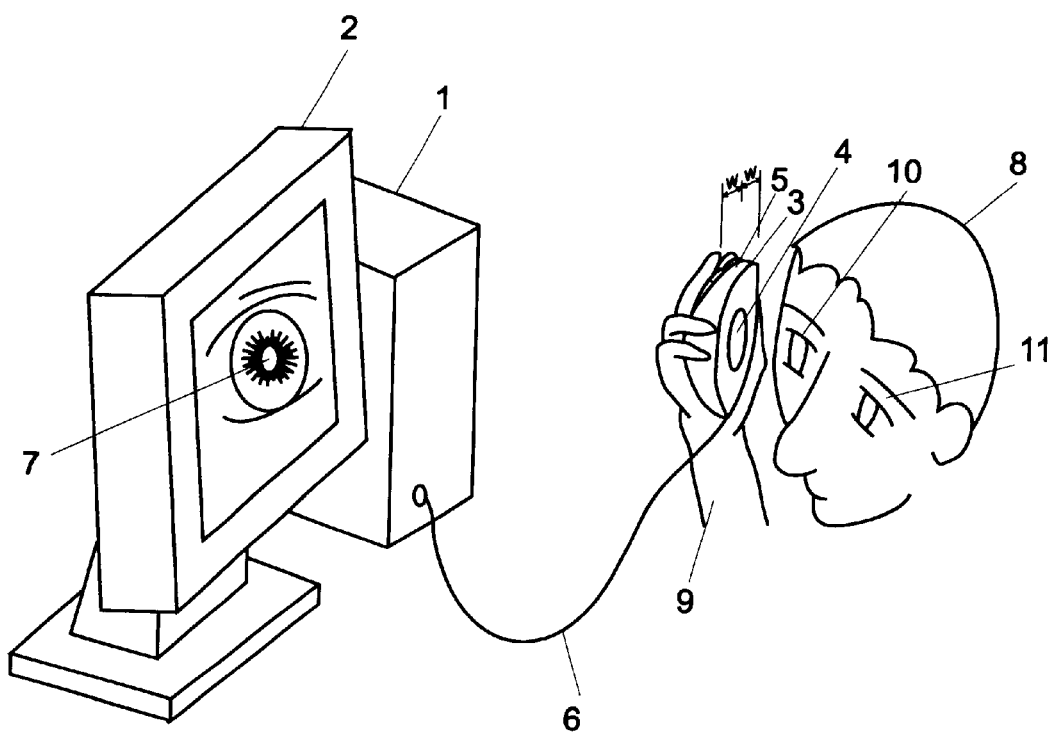
FIG. 1 is a view of the configuration of an iris image input device according to a first embodiment.

First, a description is given of a first embodiment. FIG. 1 shows a view of the configuration of an iris image input device of the first embodiment. A photographing device 3 for photographing an iris 7 generates iris code from an iris image and is connected to a personal computer (hereinafter referred to as recognition unit) 1 by a cable 6. A person to be identified 8 holds the freely movable portable photographing device 3 in their hand 9 and holds a photographing hole 4 of the photographing device 3 close to one eye 10 for carrying out registering or collation of the iris 7 for photographing. At this time, a lighting unit 13, to be described later, irradiates the iris with light in such a manner that a superior iris image can be photographed. Further, the person to be identified 8 presses a switch 5 of the photographing device 3 so that a registration or collation operation is carried out while confirming the image of an iris outputted at a monitor 2 with their other eye 11. The switch 5 is provided on the back of the surface where the photographing hole 4 is provided so as to make it easy for the person to be identified 8 to push. In the drawings, the letter W shows an equal distance of the center of the photographing hole 4 from the left and right of a surface facing the iris at the time of photographing. The photographing device 3 is for photographing an iris, and is preferably modified as follows. As the person to be identified 8 may have a fear of pointed objects, it is preferable for the photographing device 3 to be of a shape where protrusions do not enter the line of vision of the person to be identified so as not to unnerve that person. It is therefore preferable for the surface facing the iris at the time of photographing (i.e. the surface at which the photographing hole 4 and the lighting unit 13 are provided) to be flat. It is also preferable for this flat plane to be circular or elliptical so as to not be angular for similar reasons. Further, in the photographing device 3, the photographing hole 4 should preferably be positioned at the center of the flat surface for the following reasons. The first reason is to provide the largest component (the main board 14) within the photographing device 3 in a space with the broadest surface area within the photographing device 3 (i.e. the space in the proximity of the center within the photographing device 3). The second reason is so that the person to be identified 8 can make the photographing hole 4 and their own iris face each other correctly. This is because the person to be identified 8 holds the photographing device 3 in their own hand and photographs their own iris. Specifically, the person to be identified 8 can more easily adjust the position of the photographing hole 4 and the position of their own iris as the position of the photographing hole 4 becomes closer to the palm of their hand. It is therefore preferable for the photographing device 3 to have the photographing hole 4 at a vertically equidistant position because the person to be identified 8 can more easily sense and adjust the position of the photographing hole 4 and the position of their own iris 7 as the position of the photographing hole 4 becomes closer to the palm of their hand.

FIG. 1 shows the cable 6 taken from the lower side of the photographing device 3 (the position constituting the lower side when the iris image is acquired). The cable 6 is taken from the lower side of the photographing device 3 for the following two reasons. The first reason is that when the cable 6 is taken from the upper side of the photographing device 3, the cable 6 hangs downwards in an unstable manner and therefore becomes a hindrance when the person to be identified 8 wishes to move the photographing device 3. The second reason is that when the cable 6 is taken from the upper side of the photographing device 3, there are cases where the cable 6 obstructs the top of the photographing hole 4 and the photographing device 3 therefore cannot obtain an appropriate iris image.

Figure 2:
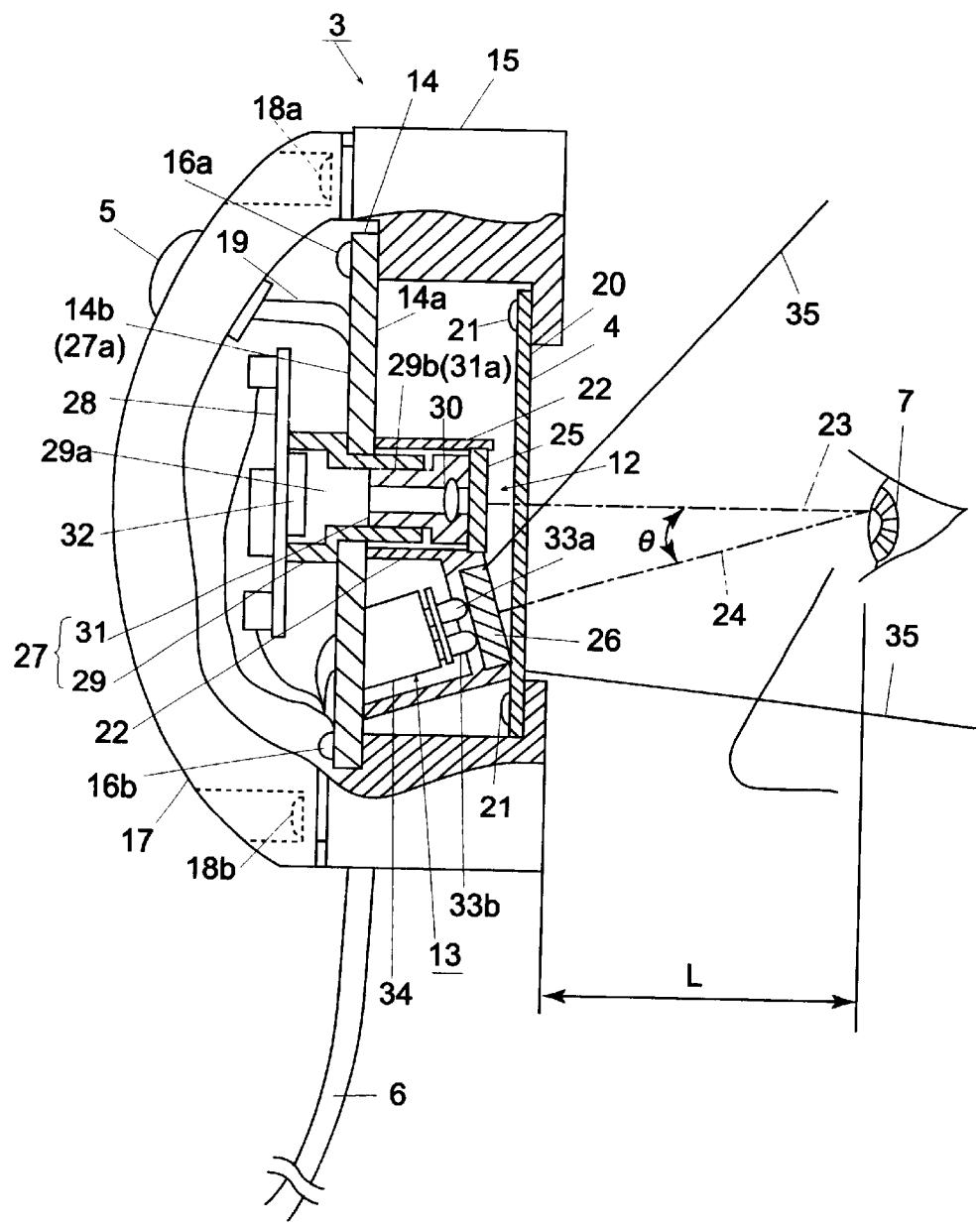
FIG. 2 is a detailed view showing the configuration of the photographing device shown in FIG. 1.

FIG. 2 is a detailed view showing the configuration of the photographing device shown in FIG. 1. The photographing device 3 contains a main board 14 to which a camera 12 and the lighting unit 13 are fixed. A lower case 15 is attached to the main board 14 using board fixing screws 16a and 16b and an upper case 17 is attached to the lower case 15 in such a manner as to cover the main board 14 using case fixing screws 18a and 18b.

A switch 5 is provided at the upper case 17 and is connected to a wiring pattern of the main board 14 using a cord 19. Protective glass 20 covers the photographing hole 4 of the lower case 15 and is attached to the lower case 15 using glass fixing screws 21 and 21.

A camera case 22 is provided at one surface 14a of the main board 14 and houses the camera 12 and the lighting unit 13. An axis of illumination 24 has an angle of intersection of $\theta$ with respect to a camera optical axis 23. Visible light cutting glass 25 provided at the camera 12 and diffusing glass 26 provided at the lighting unit 13 are inlaid in the camera case 22. A lens mount 27 and a Charge-Coupled Device (hereinafter abbreviated to "CCD") substrate 28 are attached to the remaining surface 14b of the main board 14 using screws (not shown). The lens mount 27 is divided into a main body 29 protruding into the camera case 22 in such a manner that a stepped surface 27a presses against and comes into contact with the remaining surface 14b of the main board 14 and a lens part 31 inlaid with a lens 30 for focussing light entering the device.

The main body 29 has a through hole 29a that corresponds with the camera optical axis 23 and a female screw 29b that interlocks with a male screw 31a provided at the outer peripheral surface of the lens part 31 provided at the inner periphery of the through hole 29a. A CCD sensor 32 for converting light into electrical signals is mounted on a CCD substrate 28. The CCD sensor 32 faces the lens 30 via the through hole 29a of the lens mount 27 and a through hole of the lens part 31.

The focal length of the lens 30 is fixed at a value within approximately 0.5 to 50 cm from the photographing hole 4. The reason the minimum value for the focal length of the lens 30 is taken to be approximately 0.5 cm is so that the photographing hole 4 does not come into contact with the eye 10 or eyelashes. This is because if the eye 10 or eyelashes come into contact with the photographing device 3, there is the possibility that foreign substances may become attached to the eye and eyelashes or the photographing device 3 and the person to be identified 8 will be caused to feel discomfort, which is undesirable from a health point of view. This is because if somebody then pushes the person to be identified 8 or the photographing device 3 with the eye 10 or eyelashes in contact with the photographing device 3 there is a risk of injury to the person to be identified 8. The reason the focal length of the lens 30 is taken to be a maximum of about 50 cm is in order to consider the range in which the person to be identified 8 can freely move their hand 9.

It is preferable for the minimum value for the focal length of the lens 30 to be taken to be approximately 2 cm in order to take into consideration the cases where the person to be identified 8 wears spectacles and the possibility of the person to be identified 8 or the photographing device 3 being pushed by somebody. It is also preferable for the focal length of the lens 30 to be taken to be a maximum of approximately 20 cm in order to take into consideration the case of operation by women or children. It is also preferable for the maximum value of the focal length of the lens 30 to be approximately 20 cm in order to take into consideration viewing of the iris image displayed at the monitor 2 by the remaining eye 11 without there being an awareness of the eye 10 being photographed by the photographing device 3. The reason for this is that if the photographing device 3 enters into the field of vision of both eyes, the line of vision of the person to be identified 8 moves between the photographing device 3 and the monitor 2. The position of the iris changes and an appropriate iris image can therefore not be captured, i.e. in order to obtain an appropriate iris image, it is necessary for the position of the iris not to change. In order to achieve this, the left and right eyes have to be able to unconsciously see separate objects. The width of the field of view for the case where the left and right eyes can unconsciously see separate bodies has to be approximately within 10 to 20 degrees to the left or right from the center of one of the eyes. Because of this, it is difficult to obtain an appropriate iris image if the person to be identified 8 does not photograph the iris in such a manner that the photographing device 3 does not enter the field of view within approximately 10 to 20 degrees to the left and right from the eye 11. A distance where the field of view is not entered within approximately 10 to 20 degrees from the eye 11 is within approximately 10 to 20 cm from the eye 10. It is therefore preferable for the person to be identified 8 to photograph with the photographing device 3 at a distance of within approximately 10 to 20 cm and it is therefore desirable to set the focal length of the lens 30 at a fixed value of within approximately 20 cm from the photographing hole 4. The focal length of the lens 30 is specified by the refractive index, shape and thickness of the material.

The photographing device 3 has the lens 30 in a freely mobile configuration and can also be made to be autofocussing. However, it is also preferable for the photographing device 3 to be made light, thin and compact wherever possible so as to make operation easy for the person to be identified 8. It is also preferable for the photographing device 3 to be made cheaply. In order to achieve these objectives it is necessary to remove parts from the photographing device 3 wherever possible. The photographing device 3 is therefore made with the lens 30 fixed in this embodiment and the photographing device 3 takes its power supply from the recognition unit 1 rather than having its own power unit.

The lighting unit 13 is formed from an illuminating platform 34 with three Light-Emitting Diodes (hereinafter abbreviated to "LEDs") 33a, 33b and 33c attached and fixed to one surface 14a of the main board 14. In FIG. 2, LED 33c is concealed behind LED 33a and is not shown.

The lighting unit 13 shines light on the face of the person to be identified 8 present within a line of illumination 35 via the diffusing glass 26 so that the photographing device 3 can photograph a vivid iris image. The distance L between the photographing device 3 and the iris 7 is taken to be approximately 2.0 cm or greater in order to take into consideration the shape of the face of the person to be identified 8 and cases where the person to be identified 8 is wearing glasses. The angle of intersection θ of the camera optical axis 23 and the axis of illumination 24 is set in order to satisfy the conditions of variations in the luminous intensity within the photographing range of 10% or less, a point of reflection for illumination on the eye to be photographed that is not on the iris 7 and a point of reflection for illumination of spectacles to be photographed that is not on the iris 7.

In the present invention, diffusing glass 26 is arranged at the upper surface of the LEDs 33a to 33c so that variations in the intensity of illumination in which the camera 12 of the photographing device 3 can photograph are 10% or less. The region of the light generated by the LEDs 33a to 33c is taken to be near infra-red light having a prescribed wavelength such that the iris 7 becomes bright when reflected. The luminous intensity of the LEDs 33a to 33c is also made to be a prescribed luminous intensity or less in order to consider eye safety. In this embodiment, there are three LEDs but this number can be changed providing variations in the luminous intensity of the range at which the camera 12 of the photographing device 3 can photograph is within 10%.

Figure 3:
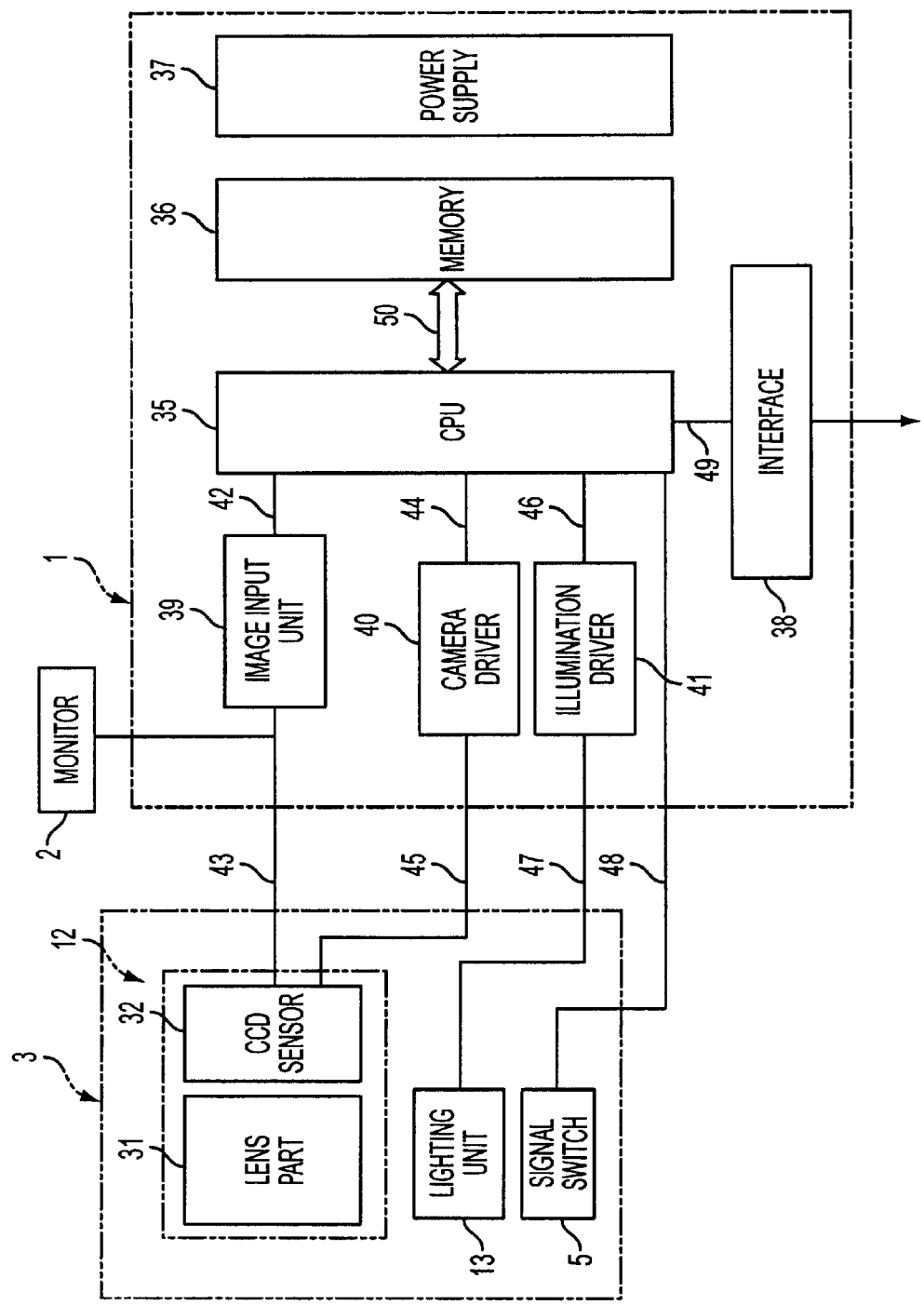
FIG. 3 is a block view of a system for the iris image input device shown in FIG. 1.

FIG. 3 is a block view of the system for the iris image inputting device shown in FIG. 1. The recognition unit 1 comprises a Central Processing Unit 35 (hereinafter abbreviated to "CPU 35"), a memory 36, a power supply 37, an interface 38, an image input unit 39, a camera driver 40 and an illumination driver 41. The power supply 37 supplies power to the whole of the device.

The CPU 35 is connected to the image input unit 39 by a signal line 42 and is further connected to the monitor 2 and the CCD sensor 32 of the camera 12 by a signal line 43. Further, the CPU 35 is connected to the camera driver 40 and the illumination driver 41 by signal lines 44 and 46 and connected to the CCD sensor 32 and the lighting unit 13 by signal lines 45 and 47, respectively. The CPU 35 is further connected to the switch 5 of the photographing device 3, to the interface 38 by signal lines 48 and 49, respectively, and to the memory 36 by a bus line 50.

Light reflected from the iris 7 incident via the lens part 31 forms an image on the CCD element surface of the CCD sensor 32. The iris image is converted to a voltage proportional to the contrast at the CCD element and sent to the image input unit 39 as an image signal via the signal lines 43. The image signal at this time is also sent to the monitor 2 and displayed as an iris image, as shown in FIG. 1.

The CPU 35 then converts the image signal for the iris image inputted to the image input unit 39 to code that can recognize an individual using an iris pattern processing program pre-stored in the memory 36. After this, when registering an iris, photographed code is stored in the memory 36. When collating an iris, code pre-registered in the memory 36 is read and is collated with newly photographed iris code.

At the time of iris pattern processing, the CPU 35 controls the camera driver 40 so as to change the image gain (gain) of the CCD sensor 32 and the value of the shutter speed so that high-quality images can be received. When there is not enough light, the illumination driver 41 is controlled and the amount of light from the LEDs 33 at the lighting unit 13 is increased.

Figure 4:
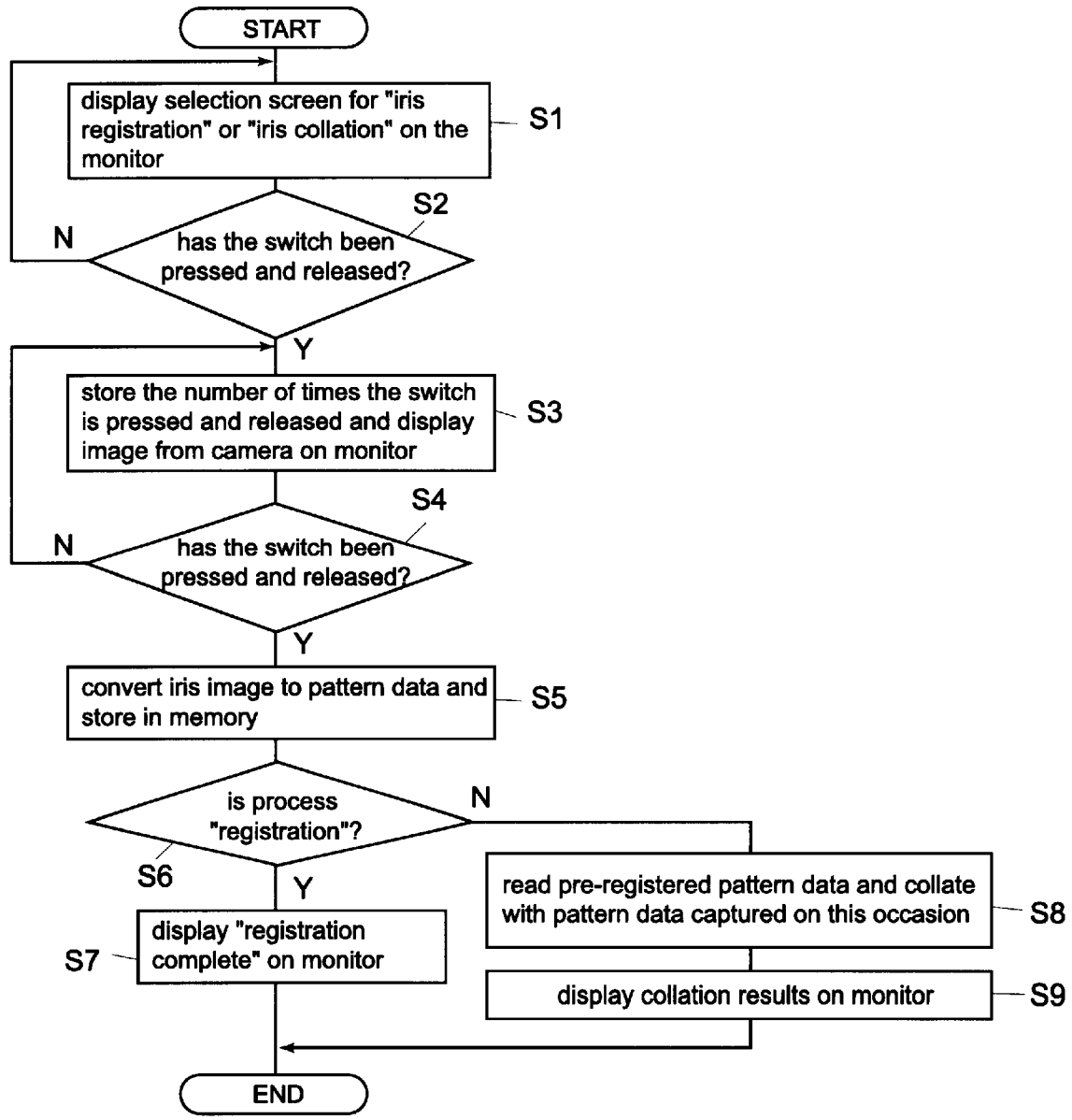
FIG. 4 is a flowchart showing the operation of the first embodiment.

FIG. 4 is a flowchart illustrating the operation of the first embodiment. When a power supply switch (not shown) of the recognition unit 1 is turned on, power is supplied from the power supply 37 to the whole of the device and start-up of the system commences. The person to be identified 8 then takes the photographing device 3 in their hand 9 and brings the photographing hole 4 of the photographing device 3 close to the eye 10 upon which iris registration or iris collation is to be carried out, as shown in FIG. 1. The case of registering the iris 7 of the right eye is shown in this embodiment.

In step S1, the CPU 35 displays a selection screen for selecting one of "iris registration" or "iris collation" on the monitor 2. When "iris registration" is to be selected at the selection screen at this time, the switch 5 at the photographing device 3 is pressed and released once and when "iris collation" is to be selected, the switch 5 is pressed and released twice. The person to be identified 8 viewing the message then presses and releases the switch 5 once or twice.

In step S2, the CPU 35 then detects whether or not the switch 5 has been pressed and released and detects the number of times of pressing and releasing.

In step S3, the CPU 35 stores the number of times the switch 5 is pressed and released in the memory 36. At this time, iris images of the eye 10 of the person to be identified 8 are taken at prescribed intervals and sequentially outputted to the recognition unit 1. The CPU 35 of the recognition unit 1 then allows the memory 36 to sequentially store iris images outputted from the photographing device 3. The memory 36 has a capacity capable of storing a plurality of frames of iris images and sequentially stores iris images outputted from the photographing device 3. If the memory 36 becomes full, old iris images are erased and new iris images are stored. The CPU 35 of the recognition unit 1 then displays iris images outputted from the photographing device 3 at the monitor 2. The person to be identified 8 then moves the photographing device 3 backwards and forwards while looking at the iris image of the right eye outputted at the monitor 2 with the other eye (i.e. left eye) 11 so that the focussing is correct (i.e. so that the pattern of the iris 7 is clear). In doing so the person to be identified 8 adjusts focusing of the iris image and pushes and releases the switch 5 when the iris image is in focus. The person to be identified 8 is therefore aware of when the iris is being photographed by the photographing device 3 because it is the person to be identified 8 themselves that presses and releases the switch 5. The person to be identified 8 can therefore control themselves so that they are not moving the instant the switch 5 is pressed. The iris image input device of the present invention can therefore acquire a clear, still and superior image of the iris.

In step S4, the CPU 35 detects whether or not the switch 5 has been pressed and released.

In step S5, after detecting pressing and releasing of the switch 5, the CPU 35 has the memory 36 continue to store iris images to for a prescribed number of images, extracts an iris image that satisfies the conditions for use in registration or collation from the iris images for the prescribed number of frames stored in the memory 36, converts the extracted iris image into signal data for recognizing an individual and stores the iris image and signal data in the memory 36.

The aforementioned conditions are, for example, the following three conditions. The first condition is that the iris image fits into a photographing frame. The second condition is that the iris image is greater than a specified size with respect to the frame. The third condition is that silhouettes of the eyelashes or reflections of the illumination are smaller that a prescribed size within the iris region.

The first condition is set to prevent iris images for which little information peculiar to an individual can be extracted and an individual can therefore not be recognized from being outputted from the frame. The second condition is set in order to prevent the kind of iris image where the image is unclear due to not being of a prescribed size with respect to the frame and information peculiar to an individual is therefore extracted in an erroneous manner. The third condition is set in order to prevent the kind of iris images where an individual cannot be identified because only a small amount of information peculiar to the individual can be extracted due to silhouettes of the eyelashes or reflections of the illumination being larger than a prescribed size within the iris region.

In step S6, the CPU 35 refers to the number of times the switch was pushed and released in step S3 stored in the memory 36 and determines whether the process is a "register iris" process or a "collate iris" process. When the process is "register iris", step S7 is proceeded to and when the process is "iris collation", step S8 is proceeded to.

In step S7, the CPU 35 displays a message that the registration is complete at the monitor 2 and the process is complete.

In step S8, the CPU 35 reads pre-registered iris pattern data from memory and collates this data with the pattern data for the iris acquired this time.

In step S9, the CPU 35 displays a message indicating the determination results of the collation processing on the monitor 2 and the process is complete.

In the above steps, the photographing device 3 sequentially outputs iris images acquired at prescribed intervals to the recognition unit 1 and the recognition unit 1 sequentially stores the iris images outputted from the photographing device 3 in the memory 36. After detecting pressing and releasing of the switch 5, the recognition unit 1 has the memory 36 continue to store iris images for a prescribed number of images, extracts an iris image that satisfies the conditions for use in registration or collation from the iris images for the prescribed number of frames stored in the memory 36, converts the extracted iris image into signal data for recognizing an individual and stores them in the memory 36. In this embodiment, parts that are surplus to the configuration can be removed from the photographing device 3 by configuring the iris image input device to operate in this manner. Namely, the photographing device 3 can be configured just with a function for outputting iris images to the recognition unit 1 and not with a function for processing iris images. The photographing device 3 can therefore be made lightweight, slim and compact and can also be made cheaply by a manufacturer.

The standard for the determination results of the collation process is decided by the extent of the security demanded for this device. The security becomes high in cases relating to money or individual privacy. In these cases, it is preferable to extract and register a large amount of characteristic data for the photographed iris image and the recognition accuracy can then be increased accordingly. However, the amount of processing increases in doing this and more time is also taken until the collation determination is complete. It is therefore necessary to set the standard for determination results for the collation processing so as to get the desired balance between the precision required in recognition and the time required in processing.

According to the first embodiment, the iris image input device of the present invention comprises a photographing device, capable of being carried in one hand, for photographing an iris and acquiring an iris image, a recognition unit for registering or collating information relating to an iris based on the iris image acquired by the photographing device and a switch for designating the start of registration or collation to the recognition unit. The photographing device is equipped with a grip of a size that can be held in the palm of a persons hand for the person to be identified to hold, illuminating means for illuminating the iris with light and a photographing hole for taking light into the device provided on a surface facing the iris during photographing, and a lens for focussing light entering the device from the photographing hole and a CCD element for converting light focussed by the lens into an electrical signal. The focal point of the lens is set so as to be fixed at a value between 0.5 and 50 cm from the photographing hole. The person to be identified adjusts the distance between their eye and the photographing device themselves so as to bring the iris image into focus. The iris image input device of the present invention can therefore be easily operated to acquire a code for an iris pattern of a person to be identified in a rapid and accurate manner regardless of the height of the person to be identified.

Second Embodiment

A second embodiment is now described. In the second embodiment, the iris image is converted into a geometrical pattern. The geometrical pattern is colored and displayed on the monitor so as to indicate whether the iris is focussed, or a message is displayed on the monitor so as to indicate the condition of the eye.

Figure 5:
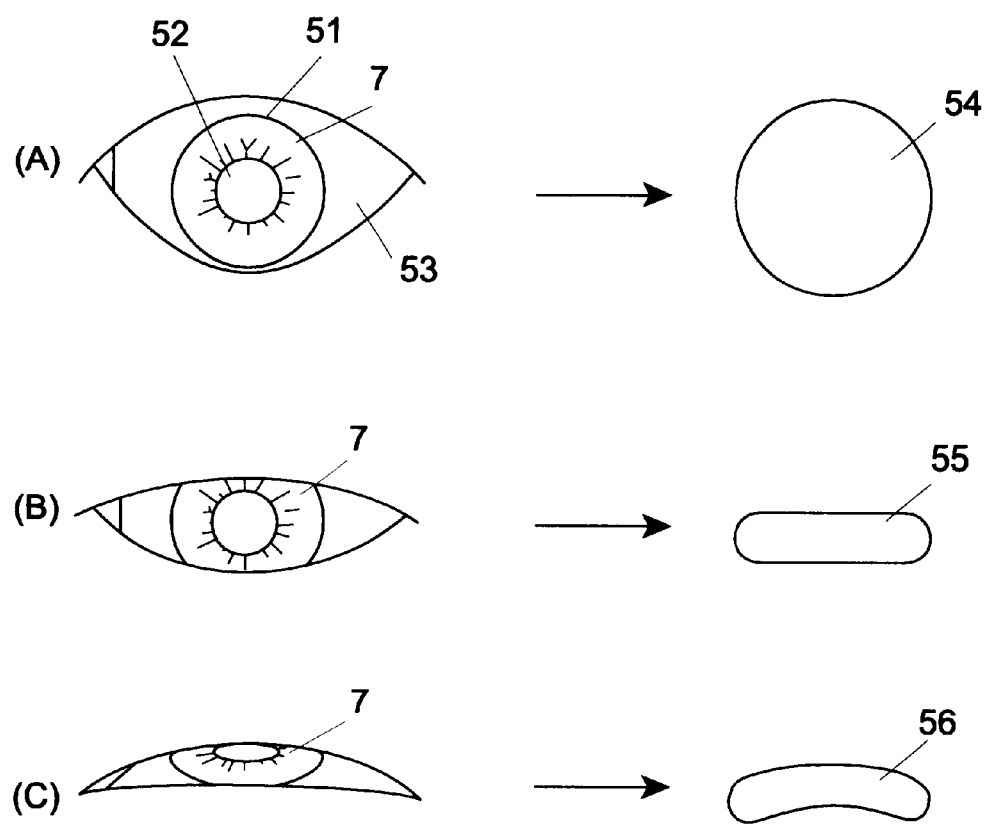
FIG. 5 is a view showing how images of eyes and geometrical patterns correspond.

FIG. 5 is a view showing how images of an eye and geometrical patterns correspond. Of the images for eyes shown on the left side of FIG. 5, image (A) shows an ideal situation where an eye is wide open, image (B) shows a situation where an eye is narrowed or is an eye of a person with narrow eyes, where the iris 7 is slightly concealed by upper and lower eyelids when compared with (A), and image (C) shows the situation when looking upwards, with the iris substantially covered by an upper eyelid.

A conversion from an image on the left of FIG. 5 to an image on the right is carried out as follows. First, the CPU 35 specifies the position of a dark portion 51 (a portion including the iris 7 and a pupil 52) from the left image (photographed image of an eye). The position of the dark portion 51 can be specified by the CPU 35 by looking for the darkest part of the image because the dark portion 51 is the darkest part of the image. Next, the CPU 35 obtains the contour of the dark portion 51. The CPU 35 can obtain the contour of the dark portion 51 by looking for areas where the difference in brightness is large because there is a substantial difference in brightness between the dark portion 51 and a peripheral white of the eye portion 53. The CPU 35 then converts contours obtained for the dark portions 51 into geometric patterns of a circle 54, an ellipse 55 and a flat ellipse 56, as shown on the left of FIG. 5(A) to (C), for displaying at the monitor 2.

The person to be identified 8 can then be aware of what kind of condition the photographed eye is in from the geometrical pattern shown at the monitor 2. The person to be identified 8 can then move their eyes so as to put the eye in the ideal state and the iris image input device of the present invention therefore lets the user know the extent to which their eyes are open.

Further, the iris image input device of the present invention can show portions represented as a geometrical pattern in, for example, green or blue when the focal point of the iris image is in focus or in red when the focal point of the iris image is not in focus. As shown in FIG. 2, whether or not the focal point of the iris image is in focus is decided by whether or not the iris 7 is present at the position of intersection of the axis of illumination 24 and the camera optical axis 23. Whether or not the iris 7 is at the position of intersection of the axis of illumination 24 and the camera optical axis 23 can be determined by detecting the output voltage of the CCD sensor 32 because the contrast of the image photographed by the camera 12 is proportional to the output voltage of the CCD sensor 32. However, a camera lens only has a certain extent of depth of field. The depth of field can be considered to be where the focal point of the image is in focus and is referred to as the range of the position of imaging of the image to be photographed. The CCD sensor 32 then outputs the voltage value if the imaging position of the photographed image is within the depth of field. The focal point of the iris image can therefore be considered to be in focus if the imaging position of the photographed image is within the depth of field even when the iris 7 is positioned close to rather than at the position of intersection of the axis of the axis of illumination 24 and the camera optical axis 23, although this depends on the focal length of the lens 30. The CPU 35 therefore obtains the contrast of the iris image, which changes in accordance with the distance between the photographing device 3 and the eye 10 to be photographed and determines that the focal point is in focus when the contrast is a certain reference value or more.

Figure 6:
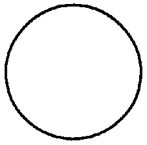
FIG. 6 is a table showing how geometrical patterns, states of eyes and indications to people to be identified correspond.
Figure 6:
Figure 6:
Figure 6:

FIG. 6 is a table of how geometrical patterns, shapes of eyes and notifications given to a person to be identified correspond and is stored in memory 36. The CPU 35 reads eye conditions and notifications given to the person to be identified from the memory 36 for displaying at the monitor 2. At this time, the CPU 35 displays portions showing the geometric pattern in the aforementioned colors in order to give notification as to whether or not the focal point is in focus.

According to the second embodiment, because the iris image is displayed as a geometrical pattern, so even people who are repulsed by iris images can take iris images without having such feelings. Further, as the condition of the eye is displayed on the monitor using messages, even novices can carry out operations to capture an ideal iris image. The person to be identified can also be made aware of when to press and release the switch in an effective manner because the geometrical pattern of the iris image is displayed in a color indicating whether or not the iris of the person to be identified is positioned in the vicinity of the focal point of the camera.

Third Embodiment

Next, a third embodiment is described. In the third embodiment, an operation panel is displayed as an icon at the monitor 2 and a mark that moves in unison with movement of the eye of the person to be identified 8 is displayed on the monitor 2.

The person to be identified 8 can then input instructions by pressing and releasing the switch 5 of the photographing device 3 two times when the mark is in the position of the intended icon. The mechanism for moving this mark is as follows. When the eye 11 moves, the CPU 35 utilizes the movement of the eye 10 that moves in unison with the eye 11 and detects the direction and extent of the movement of the eye 10. The mark is then made to move on the screen of the monitor 2 in response to the detected direction and extent of movement of the eye 10.

Figure 7A:
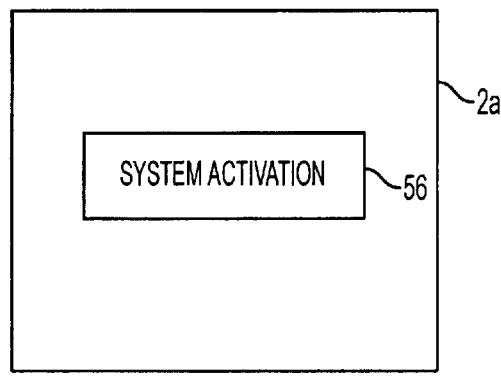
FIG. 7 shows a monitor screen showing an operation panel of a third embodiment.

FIG. 7 is a view of a monitor screen showing the operation panel of the third embodiment. FIG. 7(A) is a screen 2a for the time of activation of the system and an icon 56 is shown during system activation.

Figure 7B:
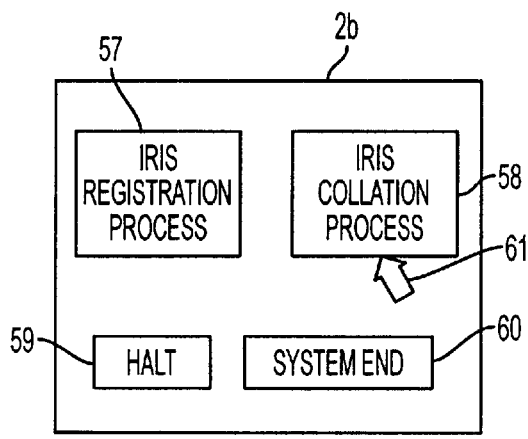
Figure 7C:
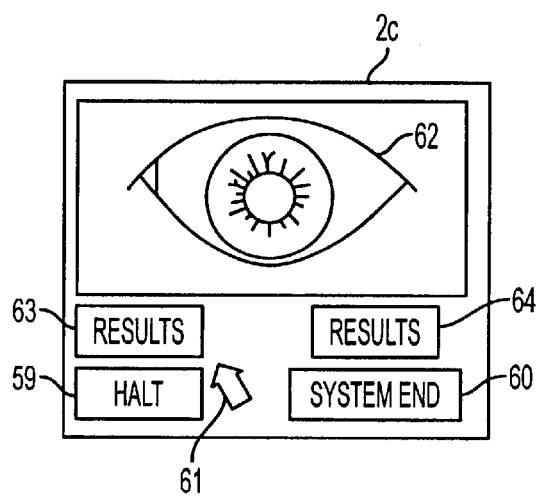

FIG. 7(B) shows the screen 2b while one of "iris registration process", "iris collation process", "halt", "system end" is selected, with icons 57 to 60 for selecting one of these options and a mark 61 for use in this selection also being displayed. FIG. 7(C) shows a screen 2c giving the iris photographing conditions, with an image 62 of the eye being photographed and icons 63 and 64 showing the results of the processing also being shown. The icons 63 and 64 are not shown during iris photographing or during processing but one of these icons is displayed as the results of the processing after the processing is complete.

The block diagram of the system for the iris image input device of the third embodiment is substantially the same as that for the first embodiment with the exception of having a characteristic detecting means and signal output means (both not shown) at the recognition unit 1 shown in FIG. 3. The characteristic detecting means extracts characteristics of the body other than the white of the eye portion 53, for example, the pupil 52, from the image 62 of the eye 10 photographed by the camera 12 and calculates the direction and extent of movement of the pupil 52. The signal output means outputs a signal that makes the mark move on the screen of the monitor 2 in response to the direction and extent of the movement of the pupil 52 to the monitor 2. This is executed by the CPU 35 based on a control program stored in the memory 36.

Figure 8:
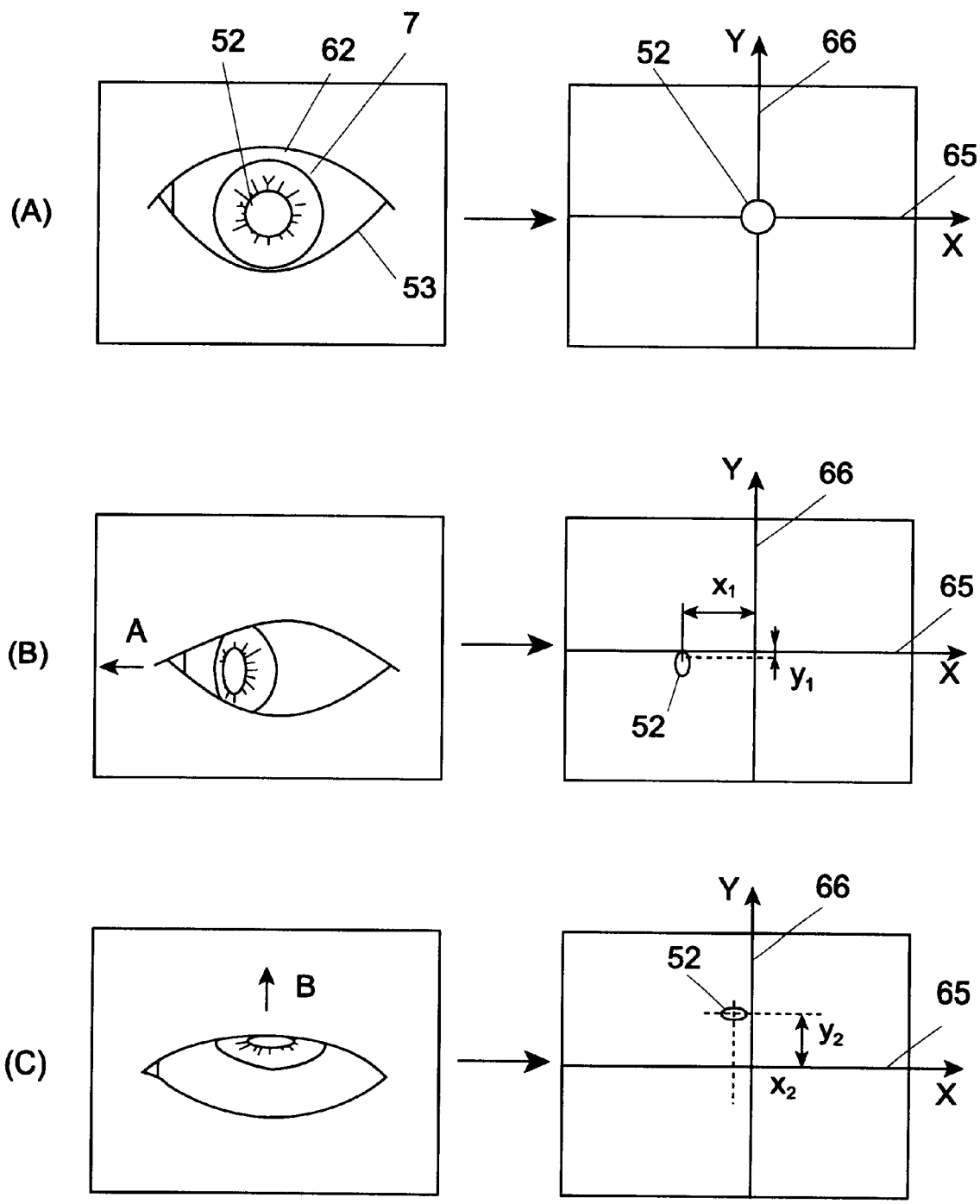
FIG. 8 is a view showing the position of a pupil extracted from an image of an eye.

FIG. 8 is a view showing the position of the pupil extracted from the image of an eye. The pupil 52 is basically the darkest portion of the eye and the CPU 35 can therefore easily extract the pupil 52 from the image of the eye. The pupil 52 also moves in a relatively dramatic manner within the image of the eye and the CPU 35 can therefore easily calculate the direction and extent of this movement.

FIG. 8(A) shows the case of a pupil 52 extracted from the image 62 of an eye facing to the front. As shown in FIG. 8(A), the CPU 35 sets an X-axis 65 and a Y-axis 66 taking the position of the pupil 52 as a starting point.

FIG. 8(B) shows the case where the person to be identified 8 moves their eye to the left (arrow A) where the position of the pupil 52 after movement is (X1, Y1). The CPU 35 then obtains amounts of movement X1 and Y1 from the starting point, converts these amounts to an amount of movement of the mark 61 on the screen of the monitor 2 and outputs a signal for moving the mark 61 to the monitor 2. As a result, the mark 61 on the screen of the monitor 2 moves in the direction of the target icon. The direction of the movement is decided by the code for X1 and Y1.

FIG. 8(C) shows the case where the person to be identified 8 moves their eyes upwards (arrow B) with the position of the pupil after moving being (X2, Y2).

Figure 9:
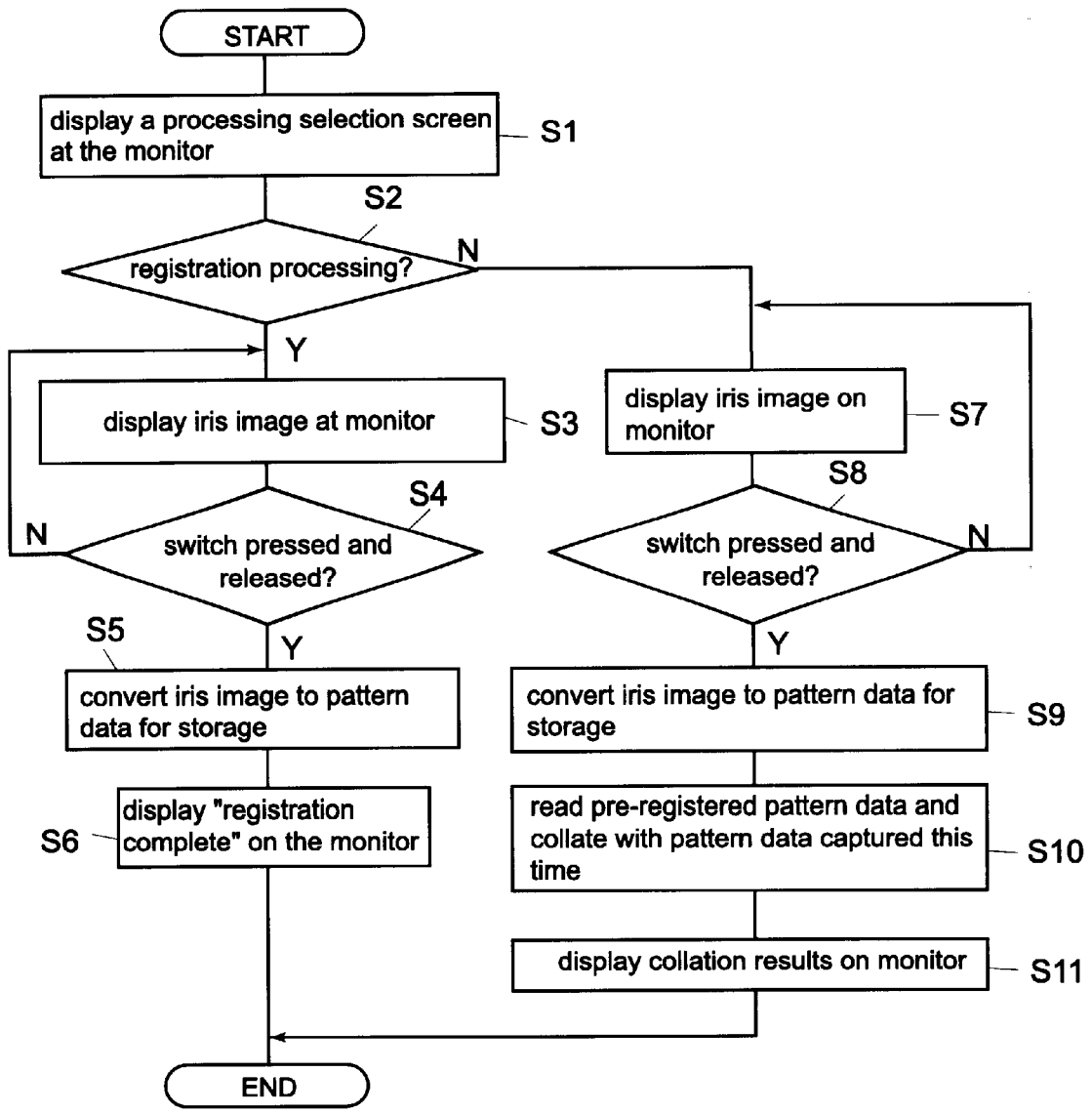
FIG. 9 is a flowchart illustrating the operation of the third embodiment.

FIG. 9 is a flowchart illustrating the operation of the third embodiment. When a power supply switch (not shown) of the recognition unit 1 is turned on, electric power is supplied from the power supply 37 to the entire device. When the system then commences start up, the screen 2a shown in FIG. 7(A) is displayed on the monitor 2. The person to be identified 8 then takes the photographing device 3 in their hand 9 as shown in FIG. 1 and brings the eye 10 (the right eye in this embodiment) that is to undergo iris registration or iris collation close to the photographing hole 4 of the photographing device 3.

In step S1, the CPU 35 displays the screen 2b shown in FIG. 7(B) at the monitor 2. The person to be identified 8 then views the icon to be selected (for example, iris registration 57) with their other eye 11. At this time, the CPU 35 displays at the monitor 2 that the mark 61 moves towards iris registration 57. The person to be identified 8 then presses and releases the switch 5 two times when the mark 61 is at iris registration 57.

In step S2, the CPU 35 determines whether or not the process is an "iris registration" process or an "iris collation" process. When the process is "iris registration" (when iris registration 57 is selected), step S3 is proceeded to, and when the process is "iris collation" (when iris collation 58 is selected), step S7 is proceeded to.

In step S3, the photographing device 3 proceeds to take photographs of the iris image of the eye 10 of the person to be identified 8 at prescribed intervals and sequentially outputs the photographed iris images to the recognition unit 1. The CPU 35 of the recognition unit 1 then sequentially stores iris images outputted from the photographing device 3 in the memory 36. The memory 36 has a capacity that is capable of storing a plurality of frames and sequentially stores iris images outputted from the photographing device 3. If the memory 36 becomes full, old iris images are deleted and new iris images are stored. The CPU 35 of the recognition unit 1 then displays the screen 2c shown in FIG. 7(C) at the monitor 2. The person to be identified 8 then moves the photographing device 3 backwards and forwards while looking at the iris image of the right eye displayed at the monitor 2 so that the focal point of the iris image becomes in focus (so that the pattern of the iris 7 becomes clear). The person to be identified 8 then carries out adjustment of the focal point of the iris image in this manner and presses and releases the switch 5 when the focal point is in focus.

In step S4, the CPU 35 detects whether or not the switch 5 has been pressed and released.

In step S5, when the CPU 35 detects that the switch 5 has been pressed and released, after continuing to store iris images in the memory 36 for a time, the CPU 35 extracts an iris image that satisfy the conditions for use in registration or collation from the iris images for the prescribed number of frames stored in the memory 36, converts the extracted iris image into signal data capable of recognizing individuals and are stored in the memory 36.

In step S6 the CPU 35 displays the icon 63 on the screen of the monitor 2 and the person to be identified 8 is notified that the registration is complete.

In step S7, the photographing device 3 proceeds to take photographs of the iris image of the eye 10 of the person to be identified 8 at prescribed intervals and sequentially outputs the photographed iris images to the recognition unit 1. The CPU 35 of the recognition unit 1 then sequentially stores iris images outputted from the photographing device 3 in the memory 36. The memory 36 has a capacity that is capable of storing a plurality of frames and sequentially stores iris images outputted from the photographing device 3. If the memory 36 becomes full, old iris images are deleted and new iris images are stored. The CPU 35 of the recognition unit 1 then displays the screen 2c shown in FIG. 7(C) at the monitor 2. The person to be identified 8 then moves the photographing device 3 backwards and forwards while looking at the iris image of the right eye displayed at the monitor 2 so that the focal point of the iris image becomes in focus (so that the pattern of the iris 7 becomes clear). The person to be identified 8 then carries out adjustment of the focal point of the iris image in this manner and presses and releases the switch 5 when the focal point is in focus.

In step S8, the CPU 35 detects whether or not the switch 5 has been pressed and released.

In step S9, when the CPU 35 detects that the switch 5 has been pressed and released, after continuing to store iris images in the memory 36 for a time, the CPU 35 extracts an iris image that satisfy the conditions for use in registration or collation from the iris images for the prescribed number of frames stored in the memory 36, converts the extracted iris image into signal data capable of recognizing individuals and are stored in the memory 36.

In step S10, the CPU 35 reads pre-registered iris pattern data from memory and makes a collation with pattern data for the iris captured on this occasion.

In step S11, the CPU 35 displays the icon 63 or the icon 64 on the screen of the monitor 2 and the person to be identified 8 is notified of the results of the determination of the collation process.

When the switch 5 is pressed and released in step S4 or step S8, iris registration processing or iris collation processing commences. At this time, when the process does not end, the person to be identified 8 can select the icon 59 or the icon 60 using the mark 61 displayed at the screen 2c and halt the process. When icon 59 is selected, the screen returns to 2b from 2c and when icon 60 is selected, the system ends.

According to the third embodiment, the person to be identified 8 can input instructions without moving their eye away from the photographing device by just looking at an icon displayed on the screen and moving the mark towards this icon. Iris images can therefore be easily input by simple operations even by a novice.

Fourth Embodiment

Next, a description is given of a fourth embodiment of the present invention. The fourth embodiment is such that the person to be identified 8 can easily hold the photographing device and is of a shape such that the position of the eye can easily be lined up with the photographing hole. The fourth embodiment is provided with a switch 72 constituting an activation switch for starting iris registration and an activation switch, 73 constituting an activation switch for starting iris collation.

Figure 10:
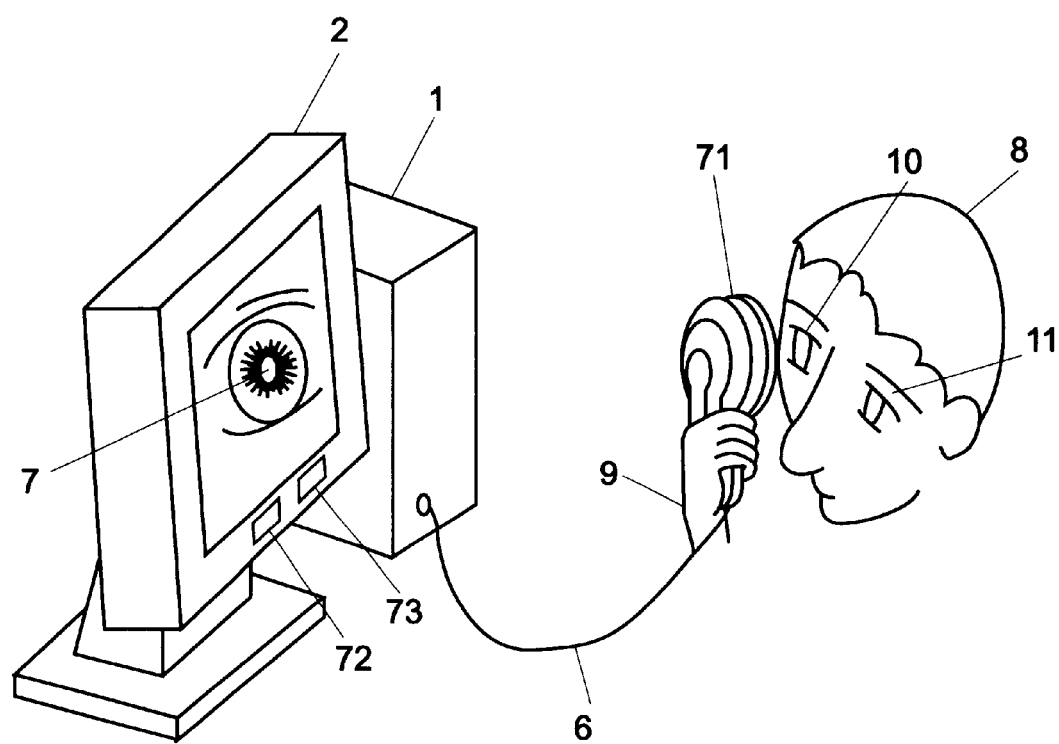
FIG. 10 is a view of the configuration of an iris image input device according to a fourth embodiment.

FIG. 10 is a view of the configuration of an iris image input device according to the fourth embodiment. In FIG. 10, a photographing device 71 for photographing the iris 7 is connected to a recognition unit 1 for performing image processing on iris patterns and carrying out identification of individuals by a cable 6. The person to be identified 8 takes the freely movable portable photographing device 71 in their hand 9 and brings the photographing hole 4 of the photographing device 71 close to the eye 10 with the iris 7 to be subjected to registration or collation. A switch 72 or 73 at the lower part of the monitor 2 is then pushed while the person to be identified 8 looks at the image of the iris 7 output at the monitor 2 at this time with their other eye 11 for confirmation and a recording or collation is then carried out.

The photographing hole 4 is provided on a flat surface at an equal distance from the left and right of the flat surface for the same reason as described for the first embodiment. The cable 6 is taken from the lower side of the photographing device 71 (the position constituting the lower side when acquiring the iris image) also for the same reason as described for the first embodiment.

Figure 11:
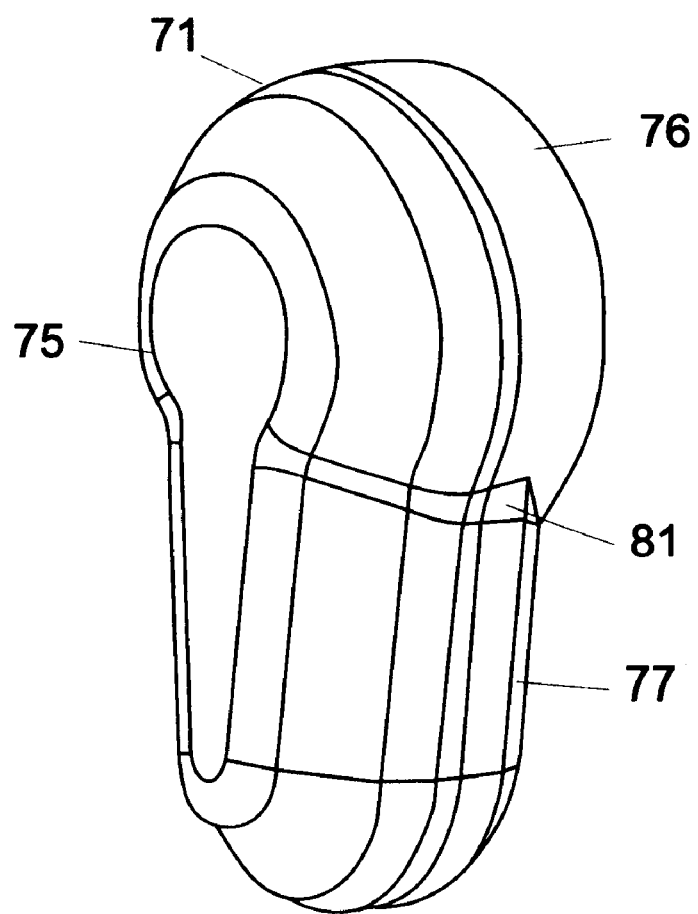
FIG. 11 is a perspective view showing a photographing device of the fourth embodiment.
Figure 12:
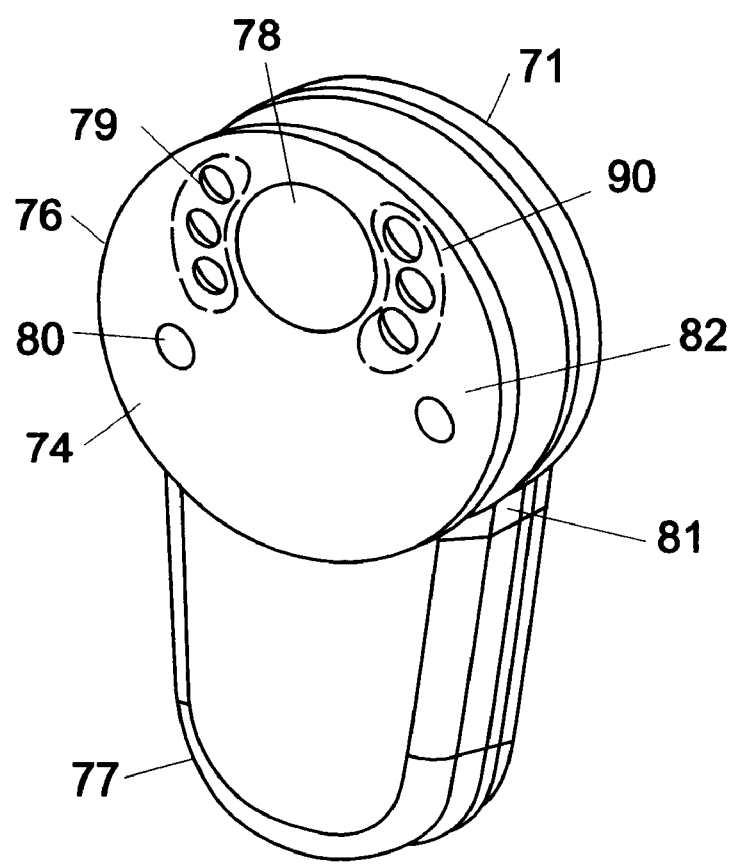
FIG. 12 is a perspective view showing the photographing device of the fourth embodiment.

FIG. 11 and FIG. 12 are perspective views showing the photographing device of the fourth embodiment, where FIG. 11 shows a rear side view of the photographing device and FIG. 12 shows a front side view of the photographing device. In FIG. 11 and FIG. 12, the external shape of the photographing device 71 is comprised by a front cover 74 and a rear cover 75. The front cover 74 and the rear cover 75 are fixed to each other by screws 80. The front cover 74 and the rear cover 75 form a photographing unit 76 and a grip 77.

The photographing unit 76 is formed as a flat approximate circle of a wider width than the grip 77 and is provided with a photographing opening 78 and an illumination opening 79. The photographing opening 78 is at one end of the photographing hole 4 covered by a half mirror 91 to be described later.

The grip 77 is of a size that can be held in one hand and the rear cover 75 is rounded. Specifically, the diameter of the curved lower part of the grip 77 is approximately 10 mm to 30 mm and the roundness of the rear cover 75 has an angle of inclination of approximately 30 to 60 degrees. The grip 77 is formed with a narrow part 81 at the border with the photographing unit 76. As the grip 77 is formed in this manner, the person to be identified 8 can have the rounded portion of the rear cover 75 come into contact with the palm of their hand and can then firmly hold the grip 77 by pushing their thumb and index finger against the narrow part 81 of the grip 77.

A reflector 82 is formed of a color that easily reflects incoming light so that the periphery of the eye 10 of the person to be identified 8 becomes bright. Specifically, the reflector 82 is of a white, off-white or mirror color with a reflectivity of 50% or more. The reason for forming the reflector 82 in this way is that the iris can then be photographed in a superior manner because the eye 10 of the person to be identified 8 reacts to the light with the pupil becoming smaller and the iris becoming larger.

Figure 13:
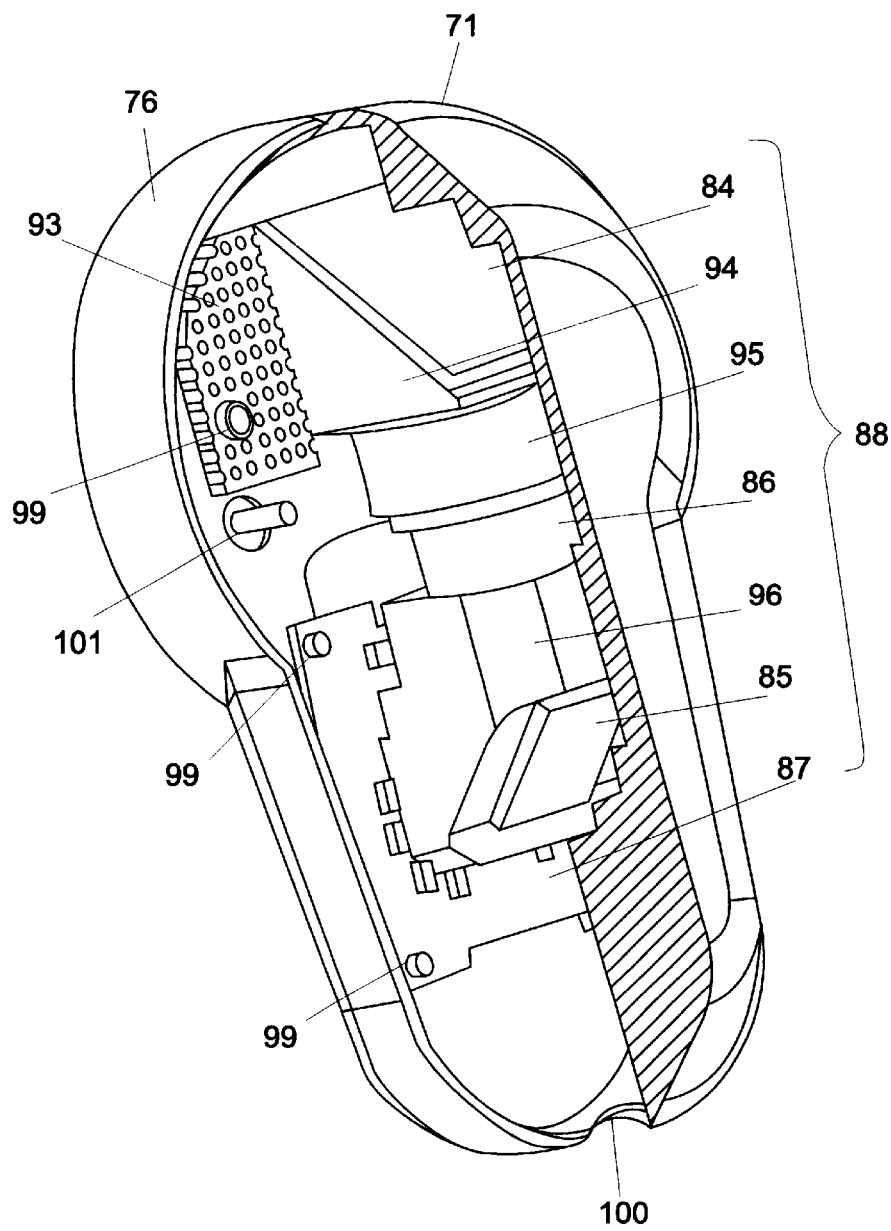
FIG. 13 is a cut-away perspective view showing the internal structure of a photographing device.
Figure 14:
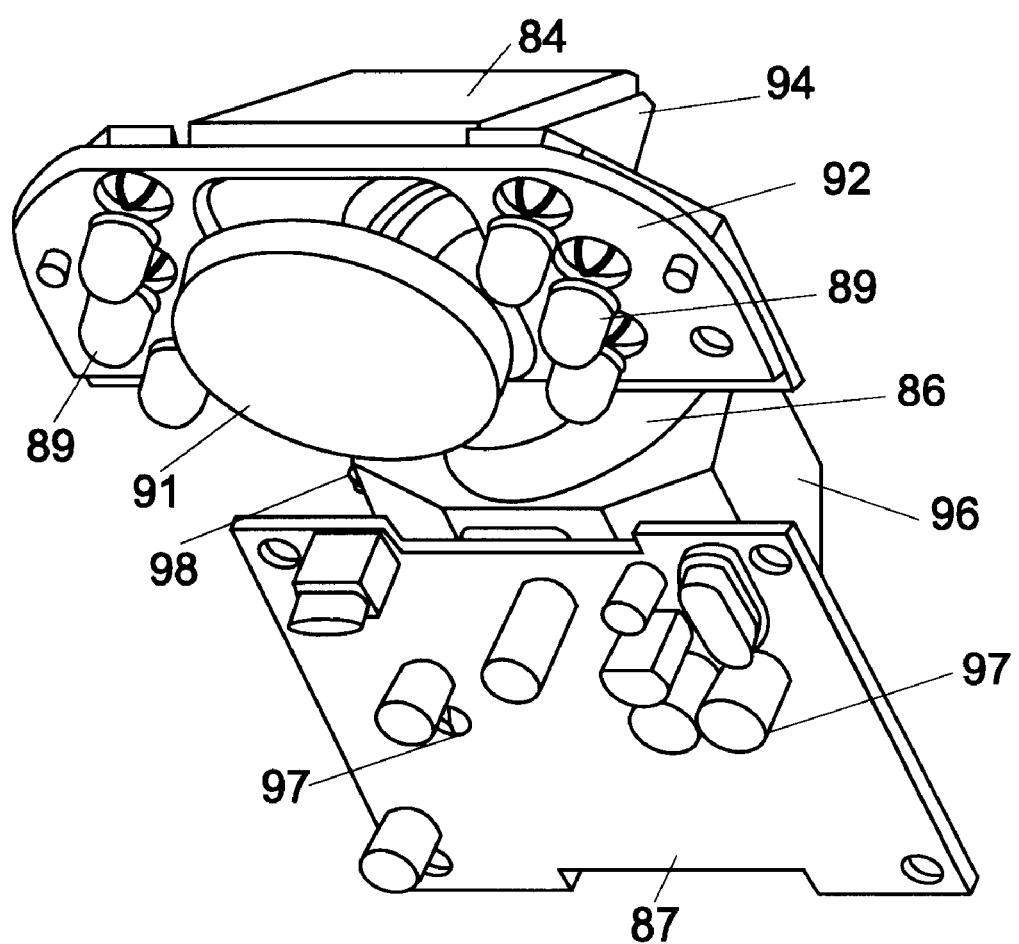
FIG. 14 is a perspective view showing an internal unit of the photographing device.
Figure 15:
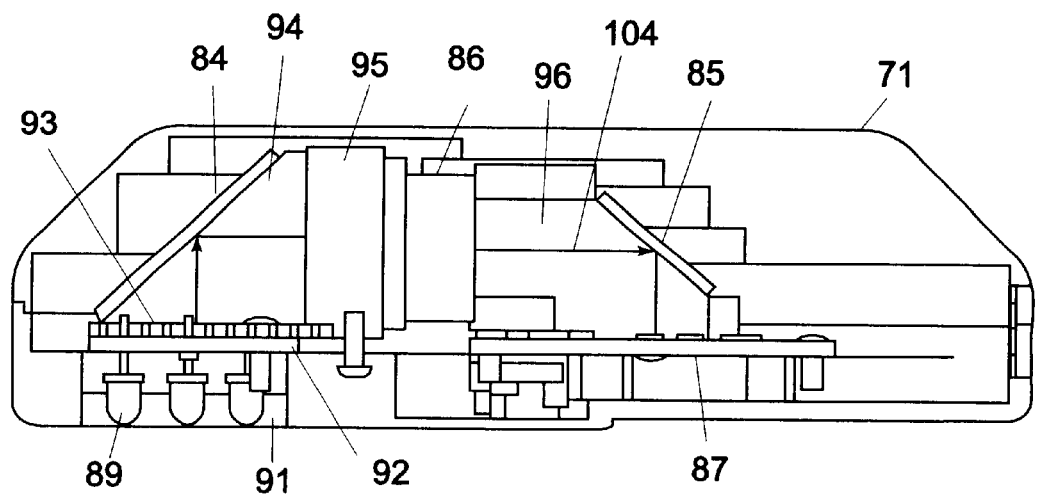
FIG. 15 is a side illustration showing the inside of a photographing device.

Next, a description is given of the internal configuration of the photographing device. FIG. 13 is a cut-away perspective view showing the internal configuration of a photographing device of a fourth embodiment, FIG. 14 is a perspective view showing an internal unit of the photographing device and FIG. 15 is a side view illustration showing the inside of the photographing device. In the drawings, the photographing device 71 comprises a camera 88 consisting of a large mirror 84, a small mirror 85, a lens unit 86 and a CCD sensor substrate 87 and a lighting unit 90 consisting of six LEDs 89.

At the large mirror 84, the half mirror 91 is attached at the front side (the side facing the iris) and the front cover 74 is attached in such a manner that the half mirror 91 and the photographing opening 78 overlap. The characteristics of the half mirror 91 differ to those of usual half mirrors in that the half mirror 91 reflects visible light and only allows near infra-red light to pass through. The half mirror 91 therefore reflects visible light of light irradiated from the lighting unit 90 and only near infra-red light reflected at the surface of the iris of the person to be identified passes through and reaches the large mirror 84. An image depicting the eye and periphery thereof of the person to be identified 8 is therefore reproduced because visible light is reflected at the half mirror 91. The person to be identified 8 can therefore easily bring the focal point of the iris image into focus without looking at the monitor by moving the photographing device 71 so that their own eye is positioned at the center of the half mirror 91.

The lighting unit 90 comprises six LEDs having peak wavelengths in the near infra-red region. The LEDs 89 are arranged three to the left and right of the half mirror 91 and light is shone from the illumination opening 79 formed at the photographing unit 76. A lighting board 93 with the LEDs 89 and a drive circuit (not shown) for driving the LEDs 89 soldered on is attached to a flange 92. The flange 92 constitutes part of the mirror holder 94. The large mirror 84, that bends the light axis of incident light that has passed through the half mirror 91, is attached to the mirror holder 94. This mirror holder 94 is coupled with a lens holder 95. A lens unit 86 then fits into the lens holder 95 and the lens unit 86 then inserts into a lens mount 96. The small mirror 85 and the CCD sensor substrate 87 are attached to the lens mount 96. Incident light reflected by the large mirror 84 passes through the lens unit 86 and arrives at the small mirror 85. The incident light is then bent by 90 degrees at the small mirror and reaches the CCD sensor arranged at the CCD sensor substrate 87. The focal length of the lens unit 86 is fixed at approximately 0.5 to 50 cm (preferably approximately 2 to 20 cm) from the photographing opening 78 for the same reason as described for the first embodiment.

A process for manufacturing the camera 88 having the above configuration will now be described. First, the small mirror 85 is attached to the lens mount 96 and the CCD sensor substrate 87 is attached to the lens mount 96 using two screws 97. Next, the lens unit 86 is fitted into the hole of the lens mount 96, lined up to a prescribed position and fixed from the side by a screw 98. This lens unit 86 is then fitted into the hole of the lens holder 95. Next, the large mirror 84 is attached to the mirror holder 94, the lighting board 93 for the LEDs 89 and LEDs 89 is attached to the flange 92 of the mirror holder 94 and the mirror holder 94 is then fitted into the hole of the lens holder 95, i.e. the lens holder is constructed so as to have the lens unit 86 fitted at one end of the hole and the mirror holder 94 fitted at the other end of the hole. In this way, the lens unit 86, mirror holder 94 and lens holder 95 comprise a single body as shown in FIG. 14 and the optical axes of the lens unit 86 and the mirror holder 94 coincide. Next, the half mirror 91 is attached to the front cover 74 in such a manner as to cover the photographing opening 78. The front cover 74 is then attached to the lens unit 86, mirror holder 94 and lens holder 95 that constitute a single body. At this time, the front cover 74 is positioned so that the screw holes of the front cover 74 line up with each of the stopping holes of the CCD sensor substrate 87 and the lighting board 93, with the lens unit 86, mirror holder 94 and lens holder 95 being fixed by screws 99 as shown in FIG. 13. Next, a cord (not shown) is passed through a cord hole 100 and the front cover 74 and the rear cover 75 are fixed using a screw 101.

Figure 16:
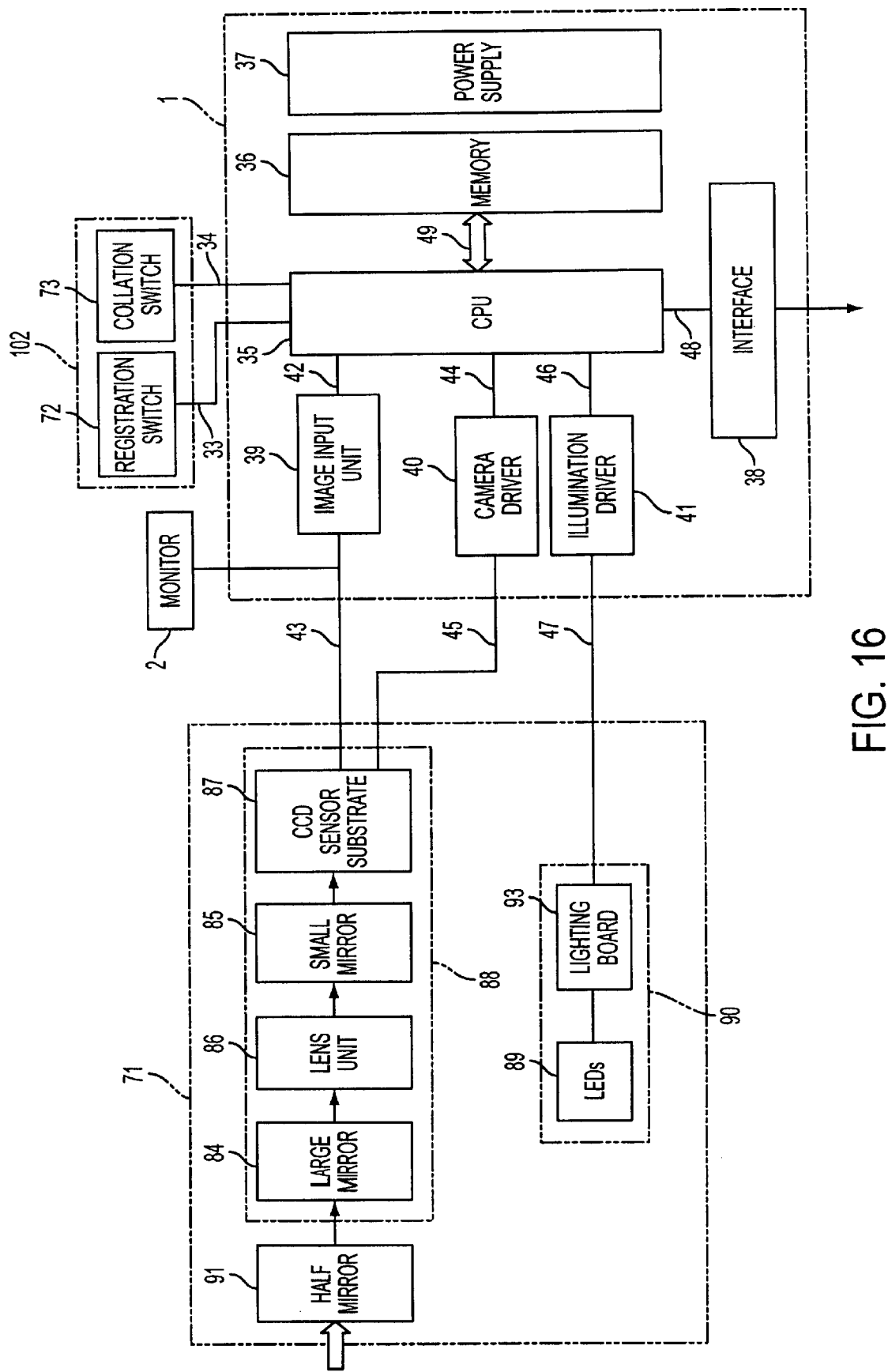
FIG. 16 is a block view of a system for the iris image input device of the fourth embodiment.

FIG. 16 shows a block diagram of the system for an iris image input device of the fourth embodiment. The configuration of the recognition unit 1 is the same as for the first embodiment, and has the CPU 35, memory 36, power supply 37, interface 38, image input unit 39, camera driver 40 and illumination driver 41. The power supply 37 supplies electrical power to the whole of the device.

The CPU 35 is connected to the image input unit 39 by a signal line 42 and is further connected to the monitor 2 and the CCD sensor 32 of the camera 12 by a signal line 43. Further, the CPU 35 is connected to the camera driver 40 and the illumination driver 41 by signal lines 44 and 46 and connected to the CCD sensor 32 and the lighting unit 13 by signal lines 45 and 47, respectively. The CPU 35 is further connected to the switch 5 of the photographing device 3 and the interface 38 by signal lines 48 and 49, respectively, and to the memory 36 by a bus line 50. The CPU 35 of the recognition unit 1 is connected to a switch unit 102 and detects pressing and releasing of a registration switch 72 and a collation switch 73 of the switch unit 102.

At the photographing device 71, light reflected from the iris 7 that has passed through the optical system for the half mirror 91 and the camera 88 forms an image on the surface of the CCD element on the CCD sensor substrate 87. The iris image is then converted to a voltage proportional to the contrast at the CCD element and sent to the image input unit 39 as an image signal via the signal line 43. At this time, the image signal is also sent to the monitor 2 to be displayed as an iris image as shown in FIG. 10 after conversion to a signal capable of displaying an image.

The CPU 35 then converts the image signal for the iris image inputted to the image input unit 39 to code that can recognize an individual using an iris pattern processing program pre-stored in the memory 36. After this, in the case of processing for registering an iris, photographed code is stored in the memory 36 and when collating, code pre-registered in the memory 36 is read and collated with newly photographed iris code. The iris registration process is executed when the registration switch 72 is pressed and released and the iris collation process is executed when the collation switch 73 is pressed and released.

At the time of iris pattern processing, the CPU 35 controls the camera driver 40 so as to change the image gain (gain) of the CCD sensor 32 and the value for the shutter speed so that high-quality images can be received. When there is not enough light, the illumination driver 41 is controlled and the amount of light from the LEDs 33 at the illumination unit 36 is increased.

Illumination due to the LEDs 89 can be arbitrarily changed by controlling the illumination driver 41 using iris code processing methods. Specifically, in addition to control patterns for controlling the amount of light, flashing and continuous illumination of all six of the LEDs 89, there also exists control patterns for controlling the amount of light, flashing, and continuous illumination of an arbitrary number of the six LEDs 89. These control patterns are selected according to iris pattern processing program specifications pre-registered in the memory 36.

The operation of the fourth embodiment is substantially the same as the operation of the first embodiment. When a power supply switch (not shown) of the recognition unit 1 is turned on, electrical power is supplied to the entire device and start up of the system commences. The CPU 35 then displays a screen for selecting iris registration or iris collation at the monitor 2. A message is then displayed at the selection screen indicating that pressing and releasing of the registration switch 72 selects iris registration and pressing and releasing of the collation switch 73 selects iris collation. The CPU 35 then drives the lighting board 93 via the illumination driver 41 and the LEDs 89 within the photographing device 71 are made to flash.

Next, as shown in FIG. 10, the person to be identified 8 brings the photographing opening 78 of the photographing device 71 close to the eye 10 to be photographed. At this time, as the photographing device 71 has a curved part and the narrow part 81, the person to be identified 8 can easily take hold of the photographing device 71 by having the palm of their hand come into contact with the curved part and their thumb and forefinger or thumb and middle finger come into contact with the narrow part 81.

The person to be identified 8 then commences photographing of the eye. At this time, as a result of the LEDs 89 of the photographing device 71 flashing, near infra-red light reflected from the iris 7 of the person to be identified 8 passes through the half mirror 91 so as to be incident to the camera 88 and the half mirror 91 reflects visible light so that the eye 10 of the person to be identified 8 is reproduced. The person to be identified 8 can then easily move the photographing device 71 so that their own eye is depicted in the center of the half mirror 91 by looking at their own eye depicted in the half mirror 91. The optical axis of the LEDs 89 is parallel to the optical axis of the light reflected by the iris that is incident to the camera 88 so as to ensure the safety of the eyes of the person to be identified 8.

The optical axis of reflected light 104 from the iris incident to the camera 88 is first bent at the large mirror 84, this light then passes through the lens unit 86, the optical axis of this light is again bent at the small mirror 85 and the light is input to the CCD sensor on the CCD sensor substrate 87.

The photographing device 71 is configured so that light entering the photographing device 71 from the photographing opening 78 is reflected using a plurality of mirrors (i.e. the large mirror 84 and small mirror 85) and is guided to the CCD sensor 32. There are three reasons for the photographing device 71 being configured in this manner. The first reason is so that the photographing device 71 is thin. The reason for this is that when a configuration where light entering the photographing device 71 from the photographing opening 78 is received directly by the CCD sensor is adopted, the photographing device 71 becomes thick. It is therefore necessary to adopt a configuration where light is received by the CCD sensor after being reflected in order to ensure that the photographing device 71 is thin. The second reason is so that the CCD sensor substrate 87 mounted with the CCD sensor 32 is arranged at a space having the broadest surface area within the photographing device 71 (i.e. the space in the vicinity of the center of the photographing device 71). The reason for this is that the CCD sensor substrate 87 is the largest component of the structure for the photographing device 71 and if the CCD sensor substrate 87 is therefore not arranged at the broadest surface area within the photographing device 71, the photographing device 71 will become large. The third reason is in order to use a narrow angle lens. With a narrow angle lens, the iris image does not become distorted in the manner that for a wide angle lens does, even when the optical axis shifts from the center of the iris 7 of the person to be identified 8. Fluctuations in amplification are small and an iris image of a high resolution can therefore be captured. However, a narrow angle lens requires a long focal length. Therefore, in this embodiment, a long focal length can be maintained within a compact photographing device 71 by reflecting the reflected light 104 using a plurality of mirrors. The photographing device 71 can also make the distance between the eye 10 of the person to be identified 8 and the half mirror 91 short even when a narrow angle lens is used by making the optical path length of the reflected light 104 long. As a result, the photographing device 71 can make the luminous intensity of the LEDs 89 small and the power consumed for lighting can therefore also be made small. Further, when the person to be identified 8 is wearing glasses, incoming light is reflected by the glasses and the iris image is then depicted. In this case, photographing of the iris has to be carried out with the glasses of the person to be identified 8 removed. However, this incoming light reflected by the glasses can be made to enter the photographic range of the camera by making the distance between the eye 10 of the person to be identified 8 and the half mirror 91 short. The photographing device 71 can therefore photograph the iris without the person to be identified 8 having to take their glasses off by making the distance between the eye 10 of the person to be identified 8 and the half mirror 91 short.

The photographing unit 76 of the front cover 74 and the half mirror 91 are both round in shape. The person to be identified 8 can therefore measure equal positions horizontally and vertically for the shapes of the photographing unit 76 and half mirror 91 by eye when looking at the photographing unit 76 and half mirror 91.

The photographing device 71 can also have an automatic focussing function added if so desired. A focussed iris image can therefore be acquired with a photographing device 71 with an automatic focussing function added by the person to be identified 8 moving the photographing device 71 so that their own eye is depicted in the center of the half mirror 91. With a photographing device 71 without an automatic focussing function added, a focussed iris image can be obtained by the person to be identified 8 moving the photographing device 71 backwards and forwards with respect to the eye 10 while looking at the image displayed on the monitor 2 with their other eye 11 after moving the photographing device 71 so that the eye 10 of the person to be identified 8 is depicted in the center of the half mirror 91. As the photographing device 71 without the automatic focussing device added can focus in this manner this focussing device 71 can therefore use a fixed focal length lens and the device can be made smaller accordingly.

When the focal point of the camera is in focus with the iris 7 and the switch 72 or the switch 73 is pressed by the person to be identified 8, the CPU 35 converts the iris image into signal data capable of identification of an individual for storage in the memory 36, as in the first embodiment. At this time, the CPU 35 successively stores iris images for a plurality of frames inputted from the photographing device 3 in the memory 36. When pressing and releasing of the switch 5 is detected, after continuing storing of iris images to the memory 36 for a short period, the CPU 35 extracts iris images satisfying the conditions for use in registration or collation from the iris images for the plurality of frames stored in the memory 36, converts these images to signal data capable of identifying individuals and stores this signal data in the memory 36. When the registration switch 72 is pressed and released, the CPU 35 displays a message that registration is complete on the monitor 2 and the process is complete. When the collation switch 73 is pressed and released, the CPU 35 reads pre-registered iris pattern data from memory, a collation is made with iris pattern data registered on this occasion, a message for the results of the collation is displayed on the monitor 2 and the process is complete.

Fifth Embodiment

Figure 17:
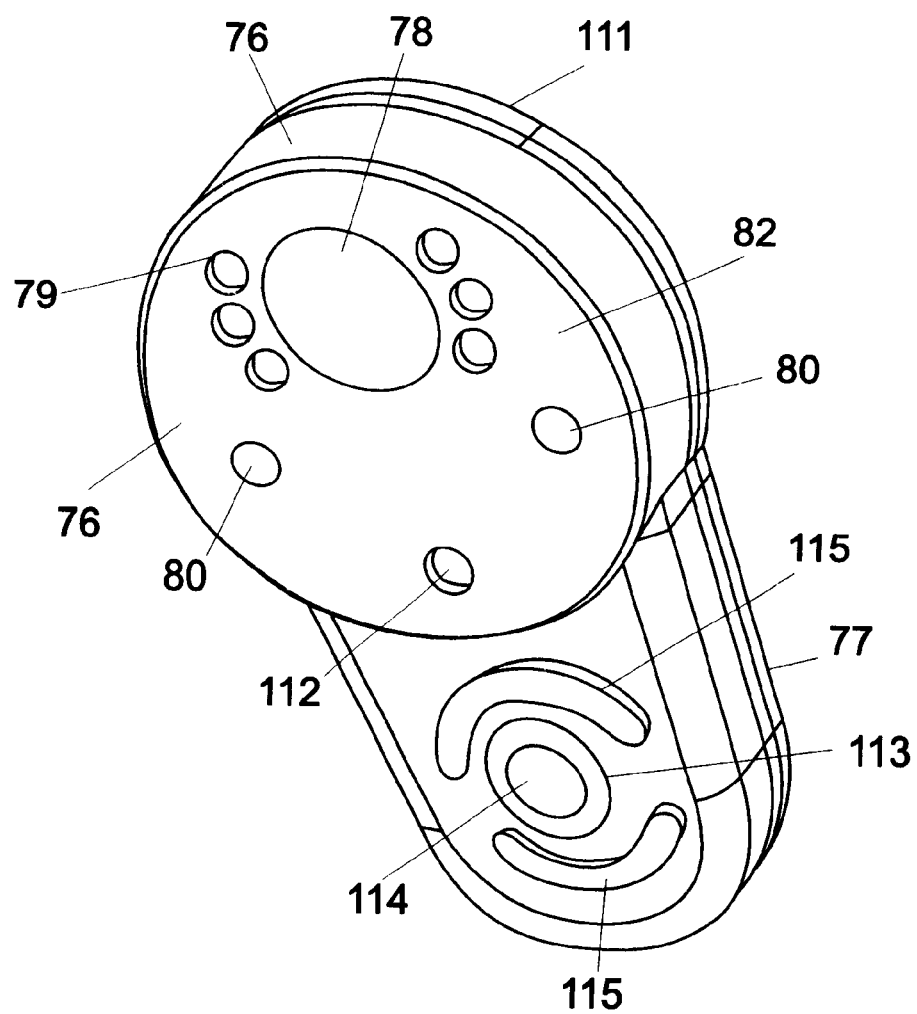
FIG. 17 is a perspective view showing a photographing device of a fifth embodiment.
Figure 18:
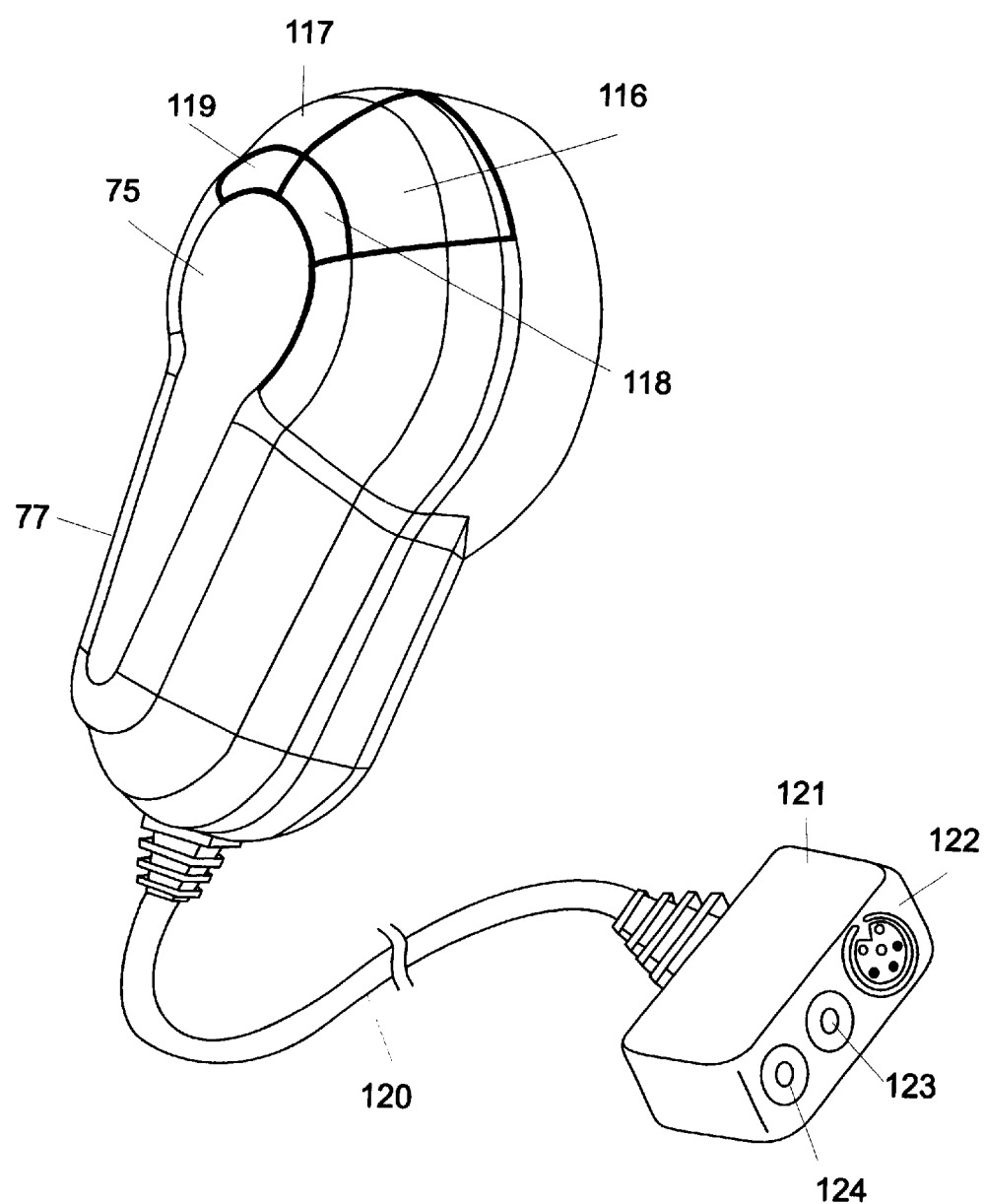
FIG. 18 is a perspective view showing the photographing device of the fifth embodiment.

Next, a fifth embodiment is described. In the fifth embodiment, the photographing device for photographing the iris is equipped with a pointing device (mouse, joystick, pressure-sensitive panel, etc.). FIG. 17 and FIG. 18 are perspective views showing a photographing device of the fifth embodiment.

With the photographing device 111 of the fifth embodiment in FIG. 17 and FIG. 18, an illumination detection sensor 112 is arranged at the side of the front cover 74 of the photographing unit 76. Light of the LEDs 89 reflected from the person to be identified 8 during iris photographing then enters the illumination detection sensor 112 because the illumination detection sensor 112 is arranged at the reflector 82. The illumination detection sensor 112 is provided within the front cover 74.

A ball cap 113 is attached at the side of the front cover 74 of the grip 77 and a ball 114 is arranged so as to be freely rotatable at the ball cap 113. Pads 115 are then installed above and below the ball cap 113. The pads 115 are for regulating the step difference between the surface of the reflector 82 and the ball 114, and the surface of the pads 115 is therefore flush with the surface of the reflector 82. This prevents the irregular movement of the photographing device 111 even when the rear cover 75 is pushed while the front cover 74 of the photographing device 111 is laid down on a table in order to operate a mouse. A right switch pad 116 and a left switch pad 117 are provided at the rear cover 75 and can be pressed independently during mouse operations to be described later. The right switch pad 116 and left switch pad 117 rotate at supports 118 and 119, respectively, and left and right switches for mouse operations can be pushed by pushing the ends of the switch pads 116 and 117.

The photographing device 111 can be connected to external devices using a cable 120 and the cable 120 has a connector block 121. The connector block 121 has connectors 122, 123 and 124.

Figure 19:
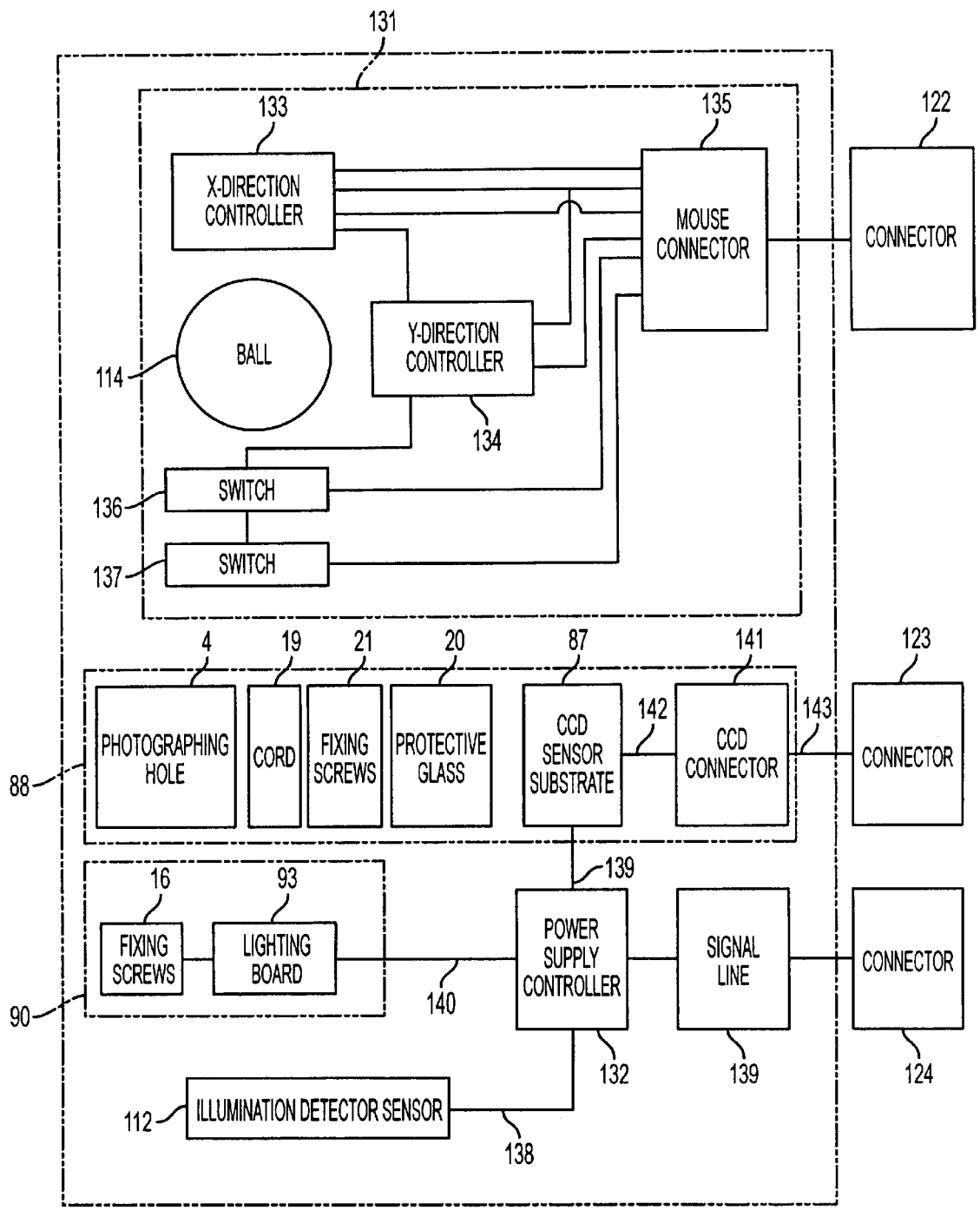
FIG. 19 is a block view showing the configuration of the photographing device of the fifth embodiment.

FIG. 19 is a block view showing the configuration of a photographing device of the fifth embodiment. In FIG. 19, the photographing device 111 comprises a camera 88, lighting unit 90, illumination detection sensor 112, mouse 131 and power supply controller 132. Each of these parts is connected by the connector to a Personal Computer (PC) via signal lines. When the photographing device 111 is moved in an arbitrary direction, the ball 114 of the mouse 131 moves in synchronism with the movement of the photographing device 111 and the extent of rotation of the ball 114 is calculated at an X-direction encoder 133 and a Y-direction encoder 134. The amount of rotation in each direction at this time or a signal relating to the amount of rotation is transmitted to an external device via a signal line 138 and a connector 122. The mouse 131 has a right switch 136 and a left switch 137 and on/off signals for when these switches 136 and 137 are pushed are also sent to external devices via the mouse connector 135, signal line 138 and connector 122.

When an iris is input in the fifth embodiment, signals are sent to an external device (for example, a personal computer) in such a manner that registration of an iris image is carried out when the right switch 136 is pressed and released and collation of an iris image is carried out when the left switch 137 is pressed and released. The monitor 2 may have the switches 72 and 73 described in the fourth embodiment, or may not have these switches.

The camera 88, lighting unit 90 and illumination detection sensor 112 are connected to the power supply controller 132. The iris or face of the person to be identified is lit up with light from the lighting unit 90 when the person to be identified 8 takes the photographing device 111 in their hand and photographs their iris and the illumination detection sensor 112 detects this brightness. The illumination detection sensor 112 then sends a detection signal to the power supply controller 132. Conversely, when the person to be identified 8 uses the photographing device 111 as a mouse on a desk, the illumination detection sensor 112 cannot detect brightness because light does not enter from the lighting unit 90, i.e. the time when the illumination detection sensor 112 detects brightness is when photographing of the iris is being carried out and the time when the illumination detection sensor 112 does not detect brightness is when a mouse operation is being carried out. The power supply controller 132 is connected to the illumination detection sensor 112 by the signal line 138. The power supply controller 132 controls the turning on and off of power input to the camera 88 and the lighting unit 90 using a signal from the illumination detection sensor 112.

The power supply controller 132 is connected to the CCD sensor substrate 87 of the camera 88 by a signal line 139 and is connected to the lighting board 93 of the lighting unit 90 by a signal line 140. Power for the camera 88 and the lighting unit 90 is supplied by the power supply controller 132. When different voltages are inputted to the CCD sensor substrate 87 and the lighting board 93, the power supply controller 132 receives power from an external device, converts this power to voltages specified for the substrates 87 and 93 and supplies this power to the substrates 87 and 93. When the power supply of the external device is an Alternating Current (AC) supply, the power supply controller 132 is equipped with both an AC/DC converter and a DC/DC converter. An AC/DC converter is unnecessary when DC is supplied to the power supply controller 132 from the external device.

The camera 88 is provided with a CCD connector 141. The CCD connector 141 is connected to the CCD sensor substrate 87 by a signal line 143 and is connected to the connector 123 by the signal line 143, i.e. image signals outputted from the CCD sensor substrate 87 are sent to the connector 123 via the CCD connector 141.

Figure 20:
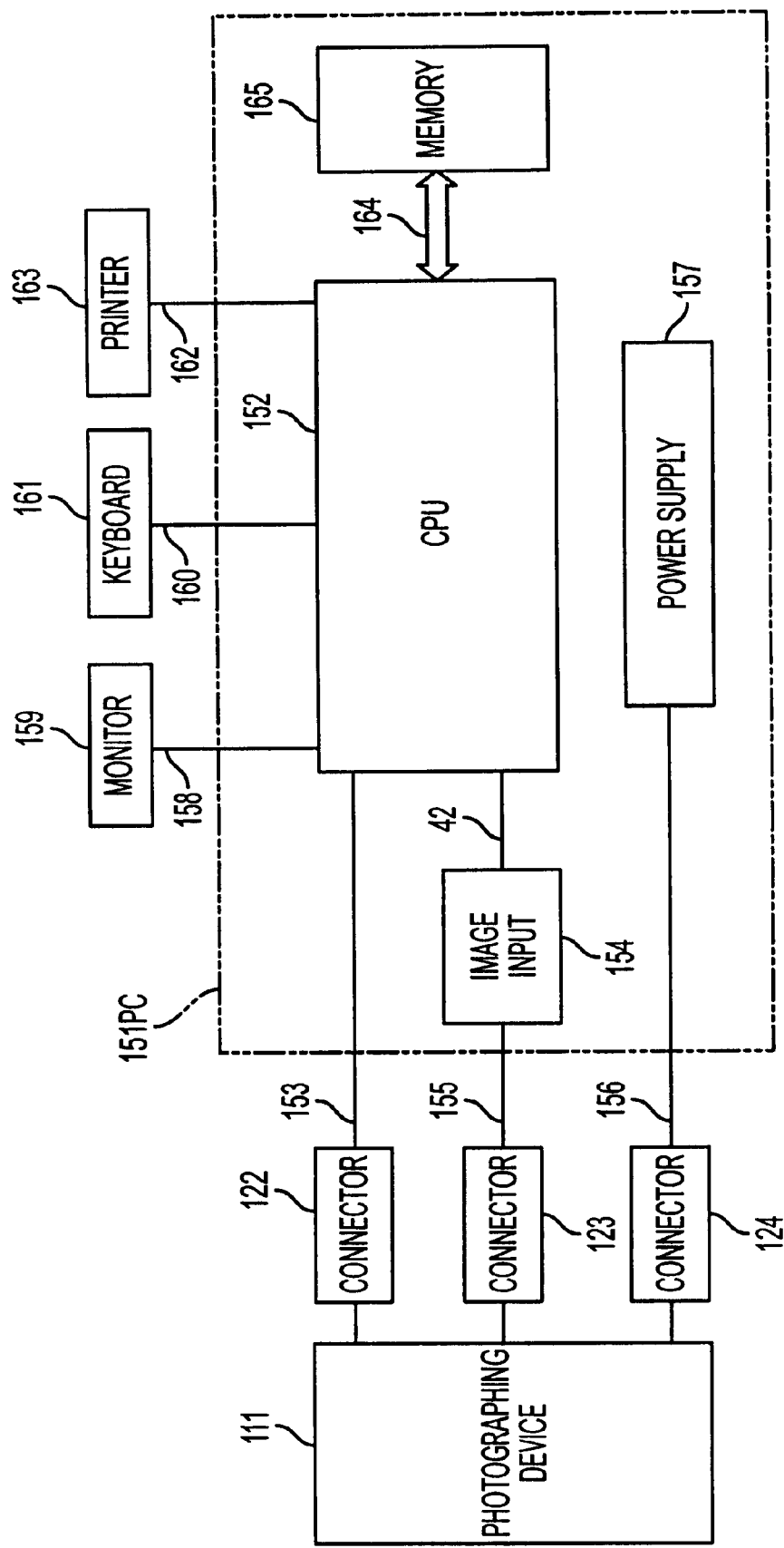
FIG. 20 is a block view of the system when a photographing device is connected to a PC.

FIG. 20 is a block view of a system for when a photographing device is connected to a personal computer (PC) in the fifth embodiment.

In FIG. 20, the connector 122 connected to the mouse 131 conforms to conventional mouse signal specifications and is connected to a mouse signal line 153 connected to a CPU 142 of a PC 151. On the other hand, the connector 123 connected to the camera 88 is an image signal and is therefore connected to an image input 154 of the PC 151 via a signal line 155. When the PC 151 is a tower-type of desktop-type PC, the image input 154 corresponds to a capture board capable of being connected to an ISA bus or PCI bus of the PC 151. The image input 154 can therefore be connected to the connector 123 by the signal line 155 when the connector 123 and the signal line 155 have specifications compatible with the capture board (for example, a pin jack or BNC connector, etc.).

The connector 124 connected to the power supply controller 132 within the photographing device 111 is connected to a power supply 157 by a signal line 156.

The CPU 152 is connected to a monitor 159 by a signal line 158, connected to a keyboard 161 by a signal line 160 and connected to a printer 163 by a signal line 162. An image signal inputted from the photographing device 111 is processed at the CPU 152 and the results of this processing are outputted to and displayed at the monitor 159 and printed out at a printer 163 if necessary.

The CPU 152 is connected to the memory 165 by a signal line 164. The memory 165 stores the iris image of the person to be identified and can register new iris images. The CPU 152 has a function for registering iris images of a person to be identified inputted at the image input 154 in the memory 165 and a function for determining whether or not a newly inputted iris image and an iris image for which registration is complete match.

A description is now given of the operation for inputting an iris image in the fifth embodiment having the aforementioned configuration. Inputting of registration or collation is carried out using the right switch 136 or the left switch 137 of the mouse 131. In the fifth embodiment, inputting of the iris image for registration or collation is carried out by pressing the right switch 136 or the left switch 137 provided at the photographing device 111. This is therefore easier to use when compared with the fourth embodiment and it becomes more difficult for the position of the eye of the person to be identified to move out of place with respect to the photographing device 111.

In the fifth embodiment, when the person to be identified 8 takes the photographing device 111 off a desk by hand during inputting of an iris image, the illumination detection sensor 112 detects the brightness of the light in the environment and sends a detection signal to the power supply controller 132. The power supply controller 132 then supplies power to the lighting unit 90. As a result, the photographing device 111 lights the LEDs 89 and an iris can be photographed. The operation from photographing the iris to acquiring an iris image in the fifth embodiment is then the same as for the fourth embodiment. The captured iris image is then inputted to the image input 154 of the PC 151 and used by the CPU 152 for registration or collation.

When photographing of the iris is complete, the photographing device 111 is, for example, placed on a desk. As the photographing device 111 is placed with the front cover 74 facing down at this time, the front cover side becomes dark. This is detected by the illumination detection sensor 112 and a signal indicating the presence of this darkness is sent to the power supply controller 132, with the power supply controller 132 then halting the supply of power to the lighting unit 90. Unnecessary power consumption due to, for example, forgetting to turn the power off is therefore avoided.

The illumination detection sensor for detecting brightness can also be provided for the photographing device 71 of the fourth embodiment.

The number of PCs with mice connected has increased in recent years and the fifth embodiment resolves the problem where work space on a desk is reduced due to connecting a mouse and a photographing device separately to a PC. This is because in the fifth embodiment the mouse function constituting the pointing device is added to the photographing device 111 and operations using the mouse and operations for inputting the iris image can be carried out with a single device.

Figure 21:
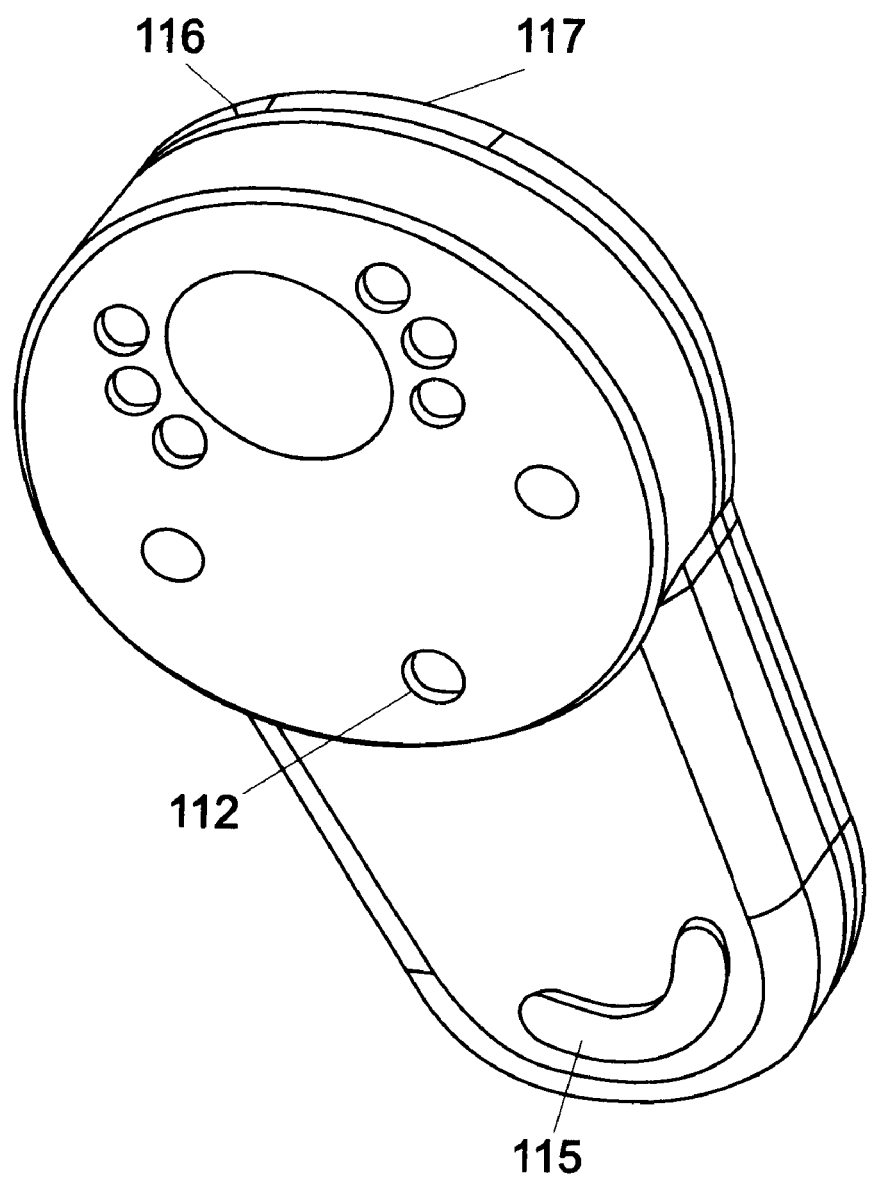
FIG. 21 is a perspective view showing an example modification of the fifth embodiment.
Figure 22:
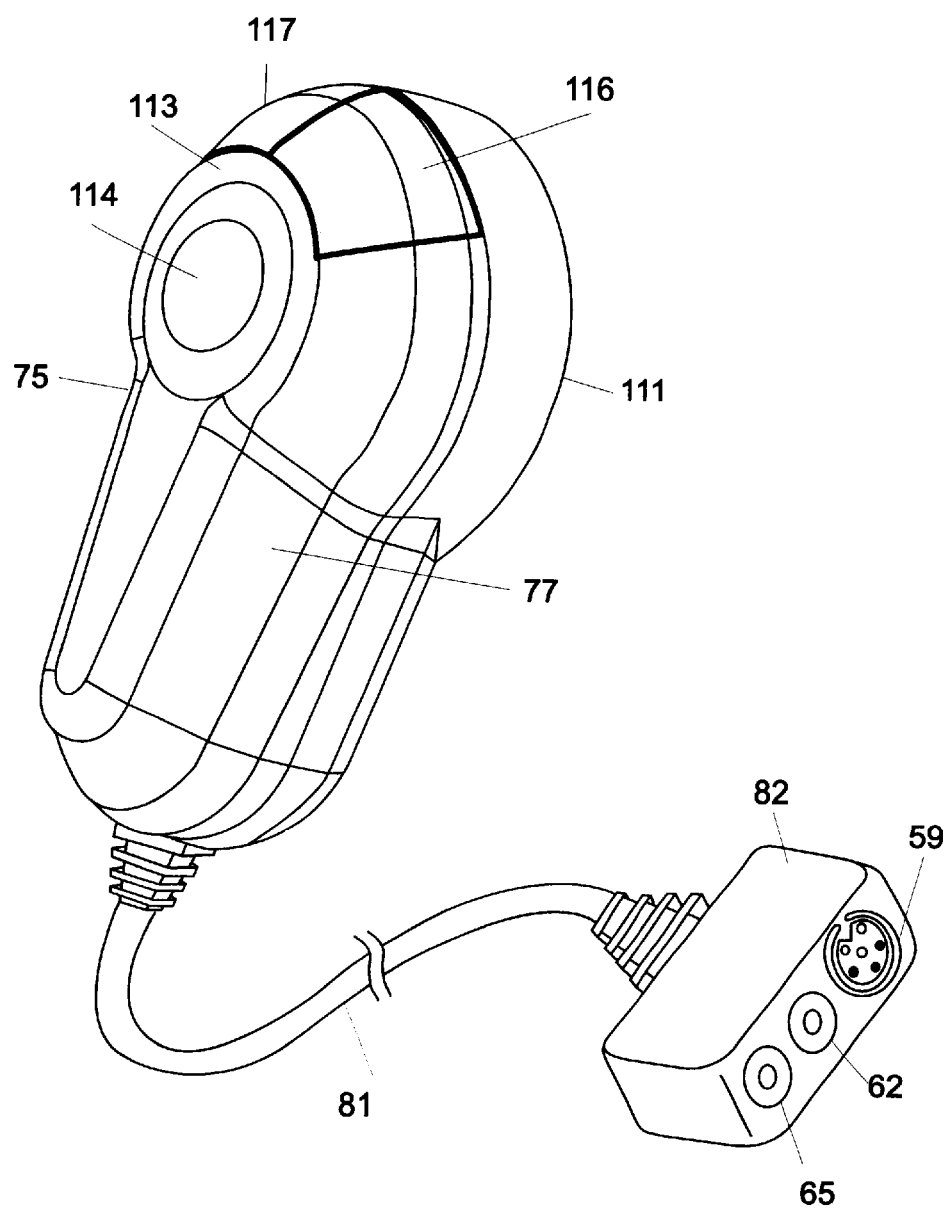
FIG. 22 is a further perspective view showing an example modification of the fifth embodiment.

FIG. 21 and FIG. 22 are perspective views showing an example modification of a photographing device of the fifth embodiment. In this example modification the mouse is provided on the rear cover rather than on the front cover.

With the photographing device 111 in FIG. 21 and FIG. 22 the ball cap 113 is provided a the photographing unit 76 of the rear cover 75 and a ball 114 is rotatably attached to the ball cap 113.

By providing the ball 114 at the rear cover 75, the person to be identified 8 can rotate the ball 114 using their finger even when holding the photographing device 111 in their hand while photographing their iris. As a result, the person to be identified 8 can, for example, move the ball 114 with their finger while the photographing device 111 is facing their eye 10, select an icon displayed at the monitor 159 and then activate a different application at the iris image input device.

According to the present invention described in detail above, with this iris image input device, the person to be identified can move the photographing device themselves in such a manner as to focus the iris image because the person to be identified can take the photographing device in their hand and photograph their own iris.

The iris image input device of the present invention can therefore easily be operated to acquire iris code for a person to be identified in a rapid and accurate manner.

What is claimed is:

1. A portable photographing device for capturing an image of an iris of a person to be identified, comprising:
   a housing having an inside and an outside, and having a first, flat surface positioned on the outside of the housing on a first side of the housing and facing the iris of the person during use and a second, curved surface positioned on the outside of the housing on a second side of the housing opposite to the first side and facing away from the iris of the person during use, the first surface defining a photographic hole, wherein the first surface is free from an eyepiece and said housing is free from any projection facing the person during use;
   lighting means for illuminating the iris positioned within the housing adjacent the photographic hole;
   a photographing element positioned within the housing adjacent the lighting means; and
   an illumination detection sensor positioned within the housing to detect light from the lighting means reflected from the person to be identified during use of the device and to control power supplied to the photographing element based on the detection of light from the lighting means.

2. The photographing device of claim 1, further comprising a switch for designating commencement of registration or collation provided on the second surface.

3. The photographing device of claim 1, wherein the first surface has first and second edges, the photographic hole being located equidistant with respect to the edges.

4. The photographing device of claim 1, further comprising a lens for focusing light entering the photographing hole, and wherein the photographing element includes a charge-coupled device element provided within the housing for converting the light focused by the lens to an electrical signal.

5. The photographing device of claim 1, wherein the lens has a focal length fixed at 2 to 20 cm from the photographing hole.

6. The photographing device of claim 1, further comprising a first mirror positioned in the housing and a second mirror positioned in the housing, the first mirror directing light from the photographing hole to the second mirror, the second mirror directing light from the first mirror to the photographing element.

7. The portable photographing device of claim 1, wherein the photographing hole has a center and an axis extending perpendicularly through the center of the photographing hole, the second surface intersecting said axis.

8. A portable photographing device for capturing an iris image, comprising:
   a housing having an inside and an outside, and having a first, flat surface positioned on the outside of the housing on a first side of the housing and facing the iris of the person during use and a second, curved surface positioned on the outside of the housing on a second side of the housing opposite to the first side and facing away from the iris of the person during use, the first surface defining a photographic hole, and the housing further having a convex grip portion having a narrower width than the first surface and shaped to be held in one hand, wherein the first surface is free from an eyepiece and said housing is free from any projection facing the person during use;
   lighting means for illuminating the iris positioned within the housing adjacent the photographic hole;
   a photographing element positioned within the housing adjacent the lighting means; and
   an illumination detection sensor positioned within the housing to detect light from the lighting means reflected from the person to be identified during use of the device and to control power supplied to the photographing element based on the detection of light from the lighting means.

9. The photographing device of claim 8, further comprising a switch for designating commencement of registration or collation positioned on the second surface.

10. The photographing device of claim 8, wherein the first surface has first and second edges, the photographic hole being located equidistant with respect to the edges.

11. The photographing device of claim 8, further comprising a lens for focusing light entering the photographing hole, and wherein the photographing element includes a charge-coupled device element provided within the housing for converting the light focused by the lens to an electrical signal.

12. The photographing device of claim 8, wherein the lens has a focal length fixed at 2 to 20 cm from the photographing hole.

13. An image input device, comprising:
   a portable photographing device for capturing an image of an iris of a person to be identified, comprising:
      a housing having an inside and an outside, and having a first, flat surface positioned on the outside of the housing on a first side of the housing and facing the iris of the person during use and a second, curved surface positioned on the outside of the housing on a second side of the housing opposite to the first side and facing away from the iris of the person during use, the first surface defining a photographic hole, wherein the first surface is free from an eyepiece and said housing is free from any projection facing the person during use;
      lighting means for illuminating the iris positioned within the housing adjacent the photographic hole,
   a photographing element positioned within the housing adjacent the lighting means, and
      an illumination detection sensor positioned within the housing to detect light from the lighting means reflected from the person to be identified during use of the device and to control power supplied to the photographing element based on the detection of light from the lighting means;

a recognition unit for registering or collating information relating to the iris based on the iris image captured by the photographing device; and a monitor for displaying the iris image captured by the photographing device.

14. The iris image input device of claim 13, wherein the recognition unit displays the iris image on the monitor as an image converted to a geometrical pattern.

15. The iris image input device of claim 13, wherein the recognition unit displays a message indicating the state of an eye on the monitor.

16. The iris image input device of claim 13, wherein the recognition unit displays the iris image on the monitor in a color indicating the iris image focus.

17. The iris image input device of claim 13, wherein the recognition unit detects a direction and extent of movement of a line of sight of the iris of the person and displays a mark on the monitor that moves in response to the direction and extent of the movement.

18. An iris image input device, comprising:
   a portable photographing device for capturing an iris image, comprising:
      a housing having an inside and an outside, and having a first, flat surface positioned on the outside of the housing on a first side of the housing facing the iris of the person during use and a second, curved surface positioned on the outside of the housing facing away from the iris of the person during use, the first surface defining a photographic hole, and the housing further having a convex grip portion having a narrower width than the first surface and shaped to be held in one hand, wherein the first surface is free from an eyepiece and said housing is free from any projection facing the person during use,
      lighting means for illuminating the iris positioned within the housing adjacent the photographic hole,
      a photographing element positioned within the housing adjacent the lighting means, and
      an illumination detection sensor positioned within the housing to detect light from the lighting means reflected from the person to be identified during use of the device and to control power supplied to the photographing element based on the detection of light from the lighting means;
   a recognition unit for registering or collating information relating to the iris based on the iris image captured by the photographing device; and
   a monitor for displaying the iris image captured by the photographing device.

19. The iris image input device of claim 18, wherein the recognition unit displays the iris image on the monitor as an image converted to a geometrical pattern.

20. The iris image input device of claim 18, wherein the recognition unit displays a message indicating the state of an eye on the monitor.

21. The iris image input device of claim 18, wherein the recognition unit displays the iris image on the monitor in a color indicating the iris image focus.

22. The iris image input device of claim 18, wherein the recognition unit detects a direction and extent of movement of a line of sight of the iris of the person and displays a mark on the monitor that moves in response to the direction and extent of the movement.

23. An iris image input device, comprising:
   a portable photographing device for capturing a plurality of iris images, comprising:
      a housing having an inside and an outside, and having a first, flat surface positioned on the outside of the housing on a first side of the housing facing the iris of the person during use and a second, curved surface positioned on the outside of the housing facing away from the iris of the person during use, the first surface defining a photographic hole, and the housing further having a convex grip portion having a narrower width than the first surface and shaped to be held in one hand, wherein the first surface is free from an eyepiece and said housing is free from any projection facing the person during use,
      lighting means for illuminating the iris positioned within the housing adjacent the photographic hole, and
      a photographing element positioned within the housing adjacent the lighting means;
   a recognition unit for registering or collating information relating to the iris based on the iris image captured by the photographing device;
   a monitor for displaying the iris image captured by the photographing device;
   means for sequentially outputting the plurality of iris images at prescribed intervals to the recognition unit;
   means for sequentially storing the plurality of iris images in the recognition unit;
   means for sequentially displaying the plurality of iris images on the monitor;
   means for adjusting the focal point of the sequentially displayed plurality of iris images until at least one iris image is in focus;
   a switch designating commencement of registration or collating of the information relating to the iris;
   means for extracting the focused iris image that satisfies at least one condition for use in registration or collation from the plurality of iris images;
   means for converting the focused iris image into signal data capable of identifying individuals; and
   means for storing the signal data.

24. The photographing device of claim 6, wherein the photographing element includes a charge-coupled device sensor, and the second mirror directs light from the first mirror to the charge-coupled device sensor.

* * * * *